(12) United States Patent
Cao

(10) Patent No.: US 10,671,961 B2
(45) Date of Patent: Jun. 2, 2020

(54) SYSTEMS AND METHODS FOR TRANSPORTATION

(71) Applicant: Hailo Technologies, LLC, Pasadena, CA (US)

(72) Inventor: Raymond Cao, Union City, CA (US)

(73) Assignee: Bao Tran, Saratoga, CA (US)

(*) Notice: Subject to any disclaimer, the term of this patent is extended or adjusted under 35 U.S.C. 154(b) by 172 days.

(21) Appl. No.: 15/872,950

(22) Filed: Jan. 16, 2018

(65) Prior Publication Data
US 2018/0189717 A1 Jul. 5, 2018

Related U.S. Application Data

(63) Continuation of application No. 14/737,480, filed on Jun. 11, 2015, now Pat. No. 9,904,900.

(51) Int. Cl.
*G06Q 10/08* (2012.01)
*G06Q 50/30* (2012.01)

(52) U.S. Cl.
CPC .......... *G06Q 10/083* (2013.01); *G06Q 50/30* (2013.01)

(58) Field of Classification Search
CPC .............................. G06Q 10/083; G06Q 50/30
See application file for complete search history.

(56) References Cited

U.S. PATENT DOCUMENTS

| | | | |
|---|---|---|---|
| 6,356,838 B1 * | 3/2002 | Paul ................... | G01C 21/3453 701/410 |
| 8,630,897 B1 * | 1/2014 | Prada Gomez ........ | G06Q 30/02 705/14.11 |
| 9,194,168 B1 * | 11/2015 | Lu ........................... | E05F 15/70 |
| 9,269,103 B1 * | 2/2016 | Kumar ................ | G06Q 30/0605 |
| 9,488,484 B2 * | 11/2016 | Lord ....................... | G01C 21/34 |
| 9,658,620 B1 * | 5/2017 | Urmson ................ | B60W 50/14 |
| 9,934,530 B1 * | 4/2018 | Iacono ............... | G06Q 30/0637 |
| 2003/0040944 A1 * | 2/2003 | Hileman ................ | G06Q 10/02 705/5 |
| 2004/0030572 A1 * | 2/2004 | Campbell .............. | G01C 21/26 705/333 |
| 2005/0240927 A1 * | 10/2005 | Hintermeister ........ | G06Q 10/10 718/100 |
| 2006/0106675 A1 * | 5/2006 | Cohen .................... | G06Q 10/06 705/26.1 |
| 2008/0109246 A1 * | 5/2008 | Russell .................. | G06Q 10/04 705/1.1 |
| 2008/0195428 A1 * | 8/2008 | O'Sullivan ............ | G08G 1/123 705/6 |
| 2010/0121739 A1 * | 5/2010 | McCarthy .............. | G06Q 30/00 705/26.1 |
| 2012/0036028 A1 * | 2/2012 | Webb ..................... | G06Q 30/06 705/15 |

(Continued)

*Primary Examiner* — Ashford S Hayles
(74) *Attorney, Agent, or Firm* — Tran & Associates

(57) ABSTRACT

Systems and methods for transportation includes a car sharing network that invites ride-sharers to join the network; a computer receiving a trip request from one or more riders including a module for: matching, by the computer, the trip request to one or more routes having a common route and satisfying a cost-effective navigation route; dispatching, by a computer, an autonomous vehicle to pick up the rider(s) along the cost-effective route; recommending an item or event of interest to the rider(s); and changing the route to accommodate the item or event.

12 Claims, 23 Drawing Sheets

(56) References Cited

U.S. PATENT DOCUMENTS

| | | | | |
|---|---|---|---|---|
| 2012/0041675 A1* | 2/2012 | Juliver | G06Q 10/08 | 701/465 |
| 2013/0073327 A1* | 3/2013 | Edelberg | G06Q 10/047 | 705/7.13 |
| 2014/0188650 A1* | 7/2014 | Sun | G06Q 30/0605 | 705/26.2 |
| 2014/0278634 A1* | 9/2014 | Horvitz | G06Q 10/063112 | 705/7.14 |
| 2014/0279596 A1* | 9/2014 | Waris | G06Q 10/083 | 705/317 |
| 2015/0185034 A1* | 7/2015 | Abhyanker | G01C 21/36 | 701/23 |
| 2015/0199619 A1* | 7/2015 | Ichinose | G01C 21/3469 | 705/5 |
| 2015/0206093 A1* | 7/2015 | Trew | G06Q 10/083 | 705/337 |
| 2015/0242944 A1* | 8/2015 | Willard | G06Q 30/0645 | 705/5 |
| 2015/0262239 A1* | 9/2015 | Goralnick | G01C 21/36 | 701/23 |
| 2015/0323333 A1* | 11/2015 | Lord | G01C 21/34 | 701/117 |
| 2015/0324708 A1* | 11/2015 | Skipp | G08G 1/127 | 705/5 |
| 2015/0324718 A1* | 11/2015 | Lord | G06Q 50/30 | 705/7.13 |
| 2015/0324734 A1* | 11/2015 | Lord | G06Q 10/083 | 705/330 |
| 2015/0325128 A1* | 11/2015 | Lord | G08G 1/20 | 705/13 |
| 2015/0379437 A1* | 12/2015 | Reich | G06Q 10/02 | 705/5 |
| 2016/0048804 A1* | 2/2016 | Paul | G06Q 10/08355 | 705/338 |
| 2016/0117610 A1* | 4/2016 | Ikeda | G06Q 10/02 | 705/5 |
| 2016/0138928 A1* | 5/2016 | Guo | G06F 16/29 | 701/537 |
| 2016/0171637 A1* | 6/2016 | Rai | H04L 67/12 | 705/13 |
| 2016/0187150 A1* | 6/2016 | Sherman | G01C 21/3438 | 705/7.15 |
| 2016/0209220 A1* | 7/2016 | Laetz | G08G 1/202 | |
| 2016/0231129 A1* | 8/2016 | Erez | G01C 21/3676 | |
| 2016/0247095 A1* | 8/2016 | Scicluna | G06Q 10/02 | |
| 2016/0321771 A1* | 11/2016 | Liu | G07B 15/00 | |
| 2016/0328669 A1* | 11/2016 | Droege | G06Q 10/06311 | |
| 2016/0334797 A1* | 11/2016 | Ross | G05D 1/0234 | |
| 2016/0349067 A1* | 12/2016 | Fowe | G06Q 30/0284 | |
| 2017/0141873 A1* | 5/2017 | Mandeville-Clarke | H04K 3/90 | |
| 2018/0025407 A1* | 1/2018 | Zhang | G06Q 50/30 | 705/26.81 |
| 2018/0075380 A1* | 3/2018 | Perl | G06Q 10/0635 | |
| 2018/0240045 A1* | 8/2018 | Zhang | G06Q 10/047 | |

* cited by examiner

FIG. 1C

| |
|---|
| Identify all packages and rides to be handled by car |
| Each package contains a drop coordinate for drone destination |
| Optimize paths for carpooling and delivery segments |
| Group package pickup and rider pickup for optimum path plan |
| Deliver riders first if possible to minimize inconvenience |
| When near the drop coordinate, open drone carrier and launch drone |
| Car continues on path and sends current GPS coordinate to drone |
| Drone flies to drop coordinate, delivers package and flies back to car |
| Drone lands in carrier and door is closed to secure drone while riders are delivered |

FIG. 2C

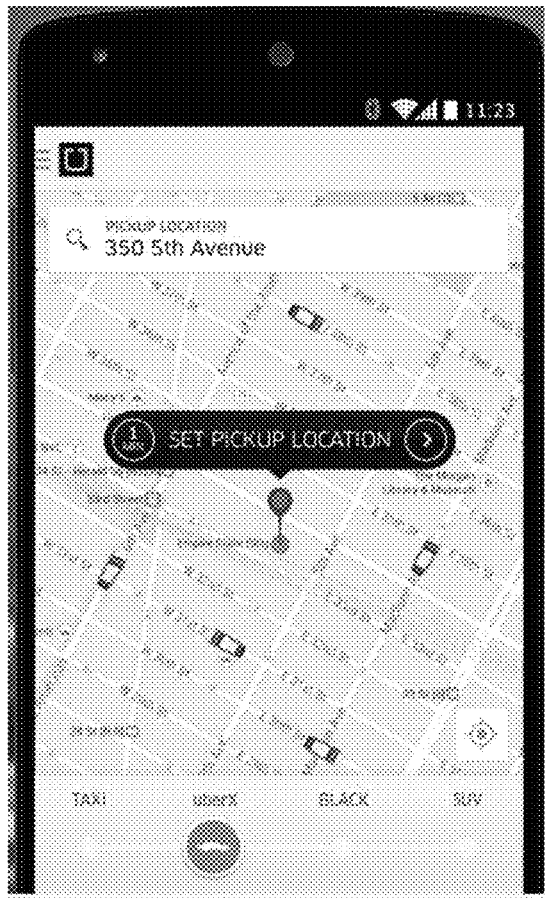

FIG. 2D

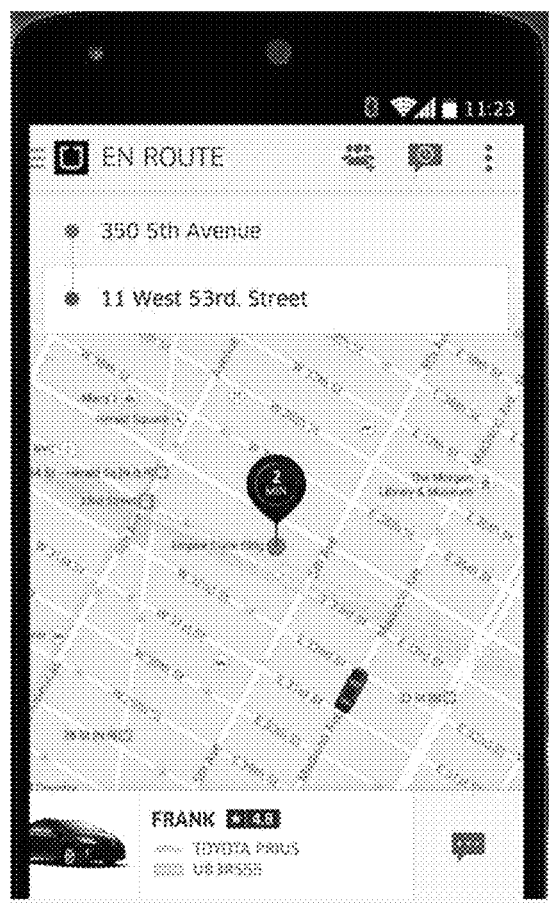

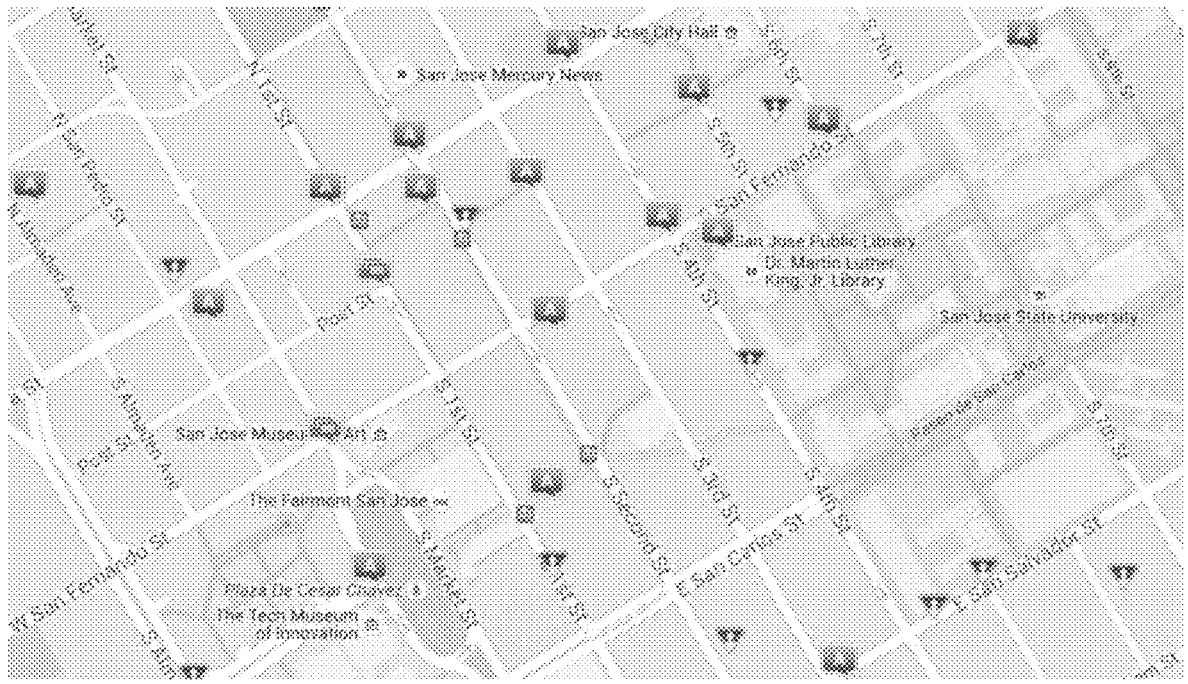

FIG. 2A

| |
|---|
| Owner registers vehicle (40) |
| If not smart car, install Immobilizer hardware (42) |
| If the vehicle needs to be located due to an emergency, the system can access its coordinates (44) |
| Owner can designate a boundary for the vehicle (44) |
| Renter registers and credit worthiness is assessed and periodically updated (48) |
| Renters use a mobile app or call a Call Center to access the rented vehicle during a reservation (50) |
| After credit approval and rental check out, navigation software sends GPS location and walking instruction to renter to access vehicle (52) |
| Renters who go beyond boundary area will receive alerts (54) |
| If the vehicle is stolen, or taken outside of a designated area, the system has the ability to notify the authorities of the vehicle's location and immobilize it (56) |

FIG. 2B

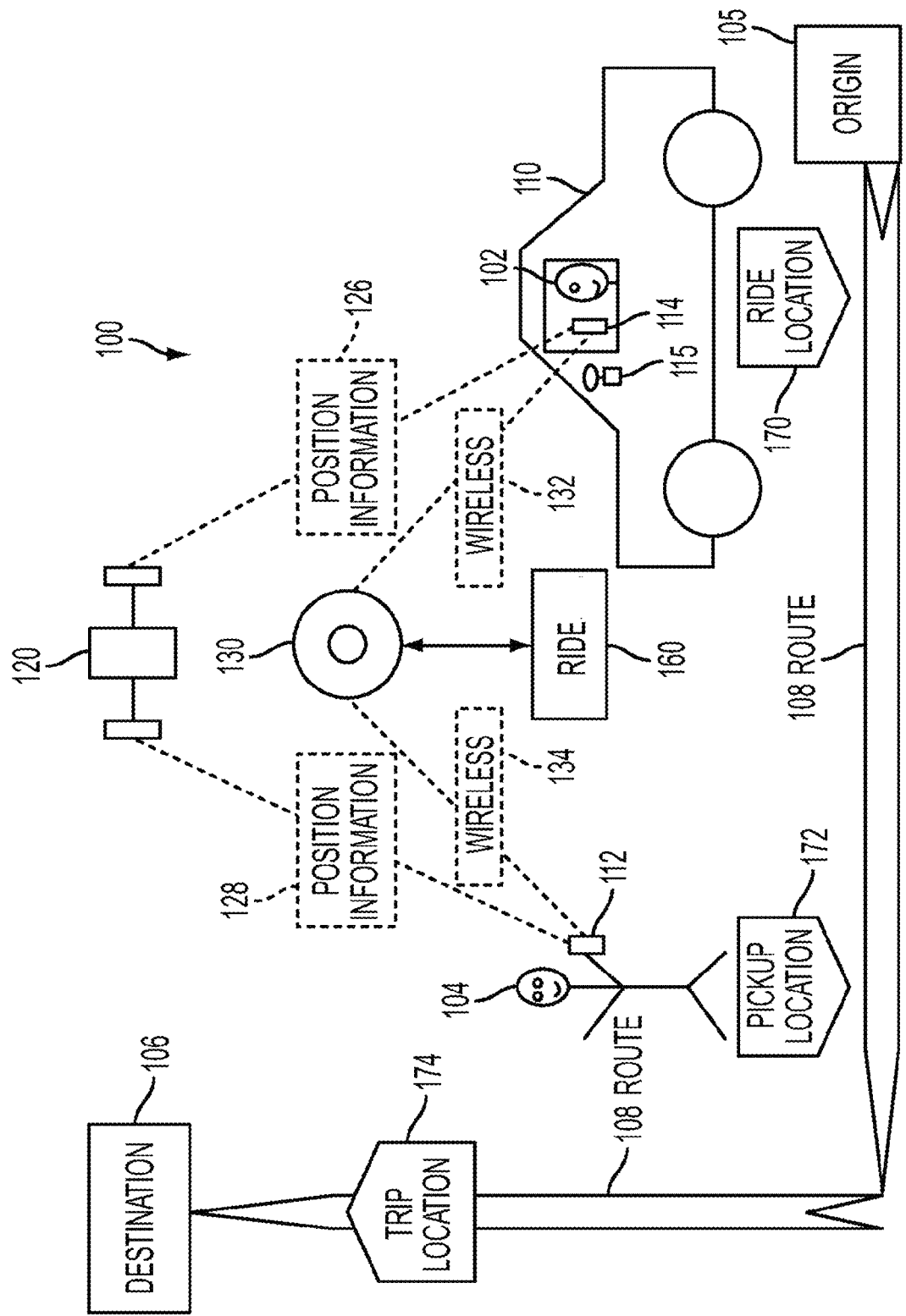

FIG. 4

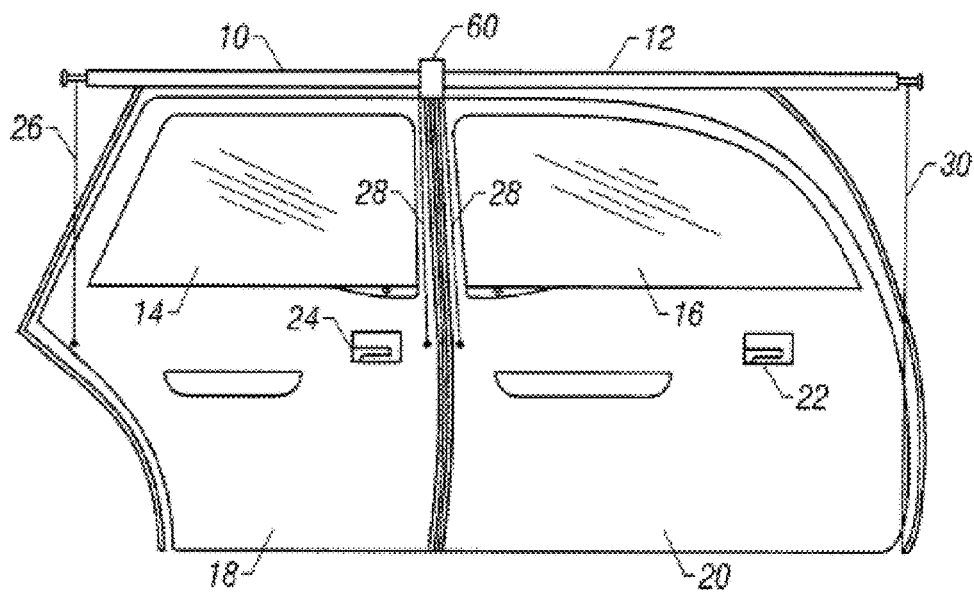

FIG. 5A

DATING

| |
|---|
| providing profiles of members for on-line dating including pictures and a social networking profile; |
| receiving a requesting member to request a date with a requested member with a meeting date, place, and time; |
| if said requested member accepts the date request from said requesting member, generating an on-demand ride-sharing request for both members to share a ride-sharing vehicle with a mobile device |

FIG. 5B

LOCAL DELIVERY USING RIDE SHARING

| |
|---|
| receive an on-demand ride-sharing request from a rider and an on-demand request to deliver a package; |
| consignor generates a product picking route which directs a store employee through the store in a predetermined manner and sends to the driver a delivery time window, an order identification number, customer information, customer address, customer specific instructions, past customer complaints to the delivery location information; |
| determine a match between the package and at least one rider; |
| generate a carpool proposal directed at a vehicle driver to pool the rider and the package; |
| instruct driver picks up the rider and package based on the carpool proposal - the rider is delivered to a destination without knowing about the package delivery. |

FIG. 5C

RIDE SHARING TO TRAIN, TERMINAL, OR OTHERS TO OPTIMIZE LONG RANGE TRAVEL W/O OWN CAR

| |
|---|
| transmit a ride-sharing request from a rider requiring first and second travel segments with first and second starting points and a destination, |
| select a first vehicle proximal to the first starting point, the first vehicle responding to the request, |
| automatically requesting a second vehicle proximal to the second starting point to pick up the rider to deliver to the destination, where the first vehicle sends a request with the second starting point to the second vehicle when the first vehicle is within a predetermined range of the second starting point; |
| determine a benefit including a parking cost or parking availability, an estimated saving in gas expenses, estimated saving in parking expenses, an estimated saving in travel tolls and an estimated saving in travel time. |

FIG. 5D

GROUP PURCHASE AND RIDE SHARING

| |
|---|
| receive a group purchase of rides and determine first and second riders interested in purchasing rides and establish a customer-defined group identity with the first and second rider being group members receiving a benefit; |
| identify the first rider as a group initiator and provides an additional benefit to the group initiator; |
| provide a benefit that is at least one of a pre-purchase incentive and a post-purchase reward to the first and second customer based on the group identity; |
| provide one or more rides by the first and second customer using the group identity; |
| identify riders other than the group initiator as being sub-group initiators based on their inducement of other riders to join the group in a hierarchical manner, and provide additional benefit to the sub-group initiators; |
| identify a first set of points of pick-up or drop-off, each point of pick-up or drop-off in the first set reachable from a planned navigation route with a cost less than a first threshold cost; |
| identify a second set of points of pick-up or drop-off, the planned navigation route reachable from each point of pick-up or drop-off in the second set with a cost less than a second threshold cost, wherein the group purchase includes delivery routes including the first and second sets of points; |
| deliver items in the group order. |

| Traveler | User-1 | User-2 | User-N | Matching | Recommendation |
|---|---|---|---|---|---|
| Speed | X |  | X | 2 | Yes |
| Acceleration |  | X |  | 1 | No |
| Drunk | X | X | X | 3 | Yes |
| Sober |  | X | X | 2 | Yes |
| Location-1 | X | X | X | 3 | Yes |
| Belt used |  |  |  | 0 | No |
| Position |  |  | X | 1 | No |
| Location-6 | X | X | X | 3 | Yes |
| Location-N |  | X |  | 1 | No |
| Indicator used | X | X | X | 3 | Yes |
| Matching | 5 | 7 | 7 |  |  |

FIG. 15B
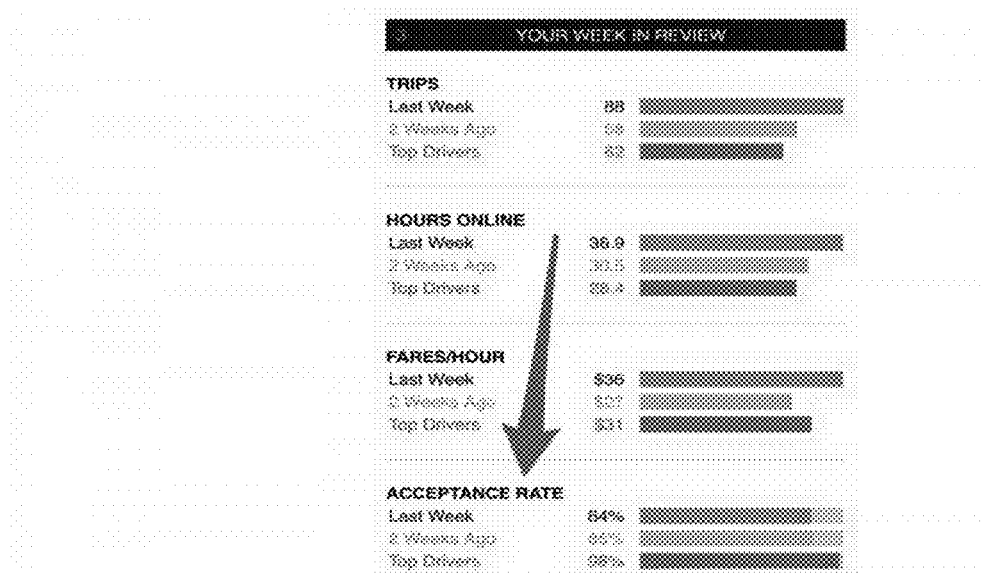
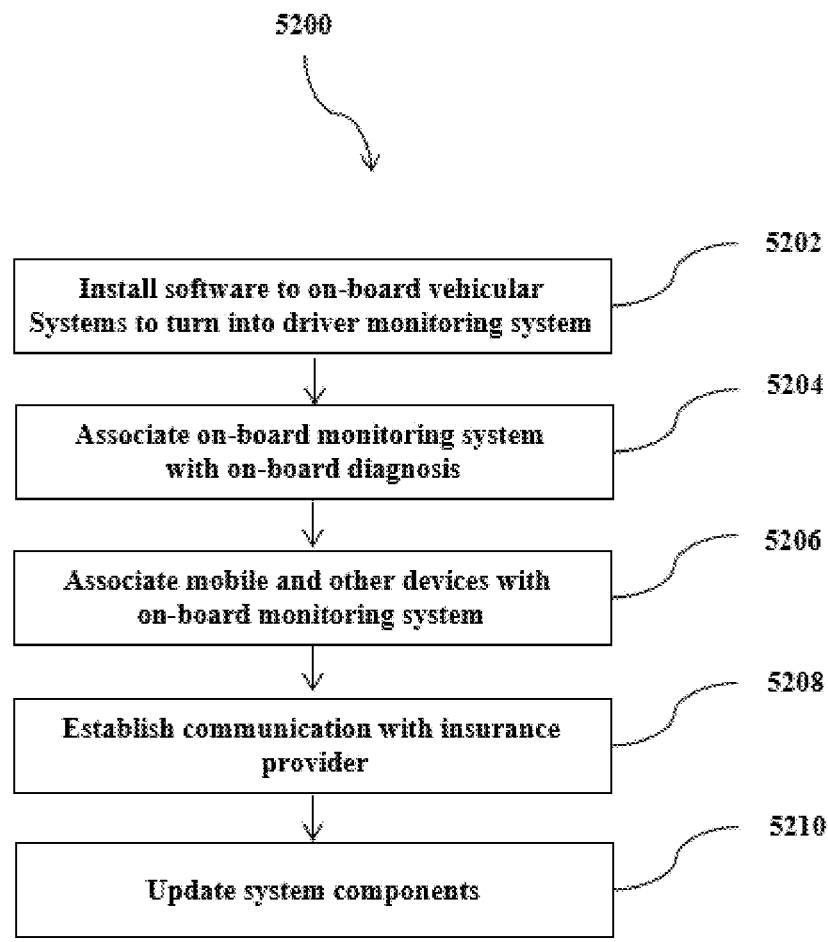
FIG. 16

SYSTEMS AND METHODS FOR TRANSPORTATION

The present invention relates to transportation.

BACKGROUND

In the last few decades, the number of vehicles used by drivers is continuously increasing, and traffic congestion became a common phenomenon and an urban problem. Due to traffic congestion, many drivers spend a significant amount of time, sometimes over one hour, in order to travel by car over a relatively short route. This may result in, for example, a waste of precious time that the driver needs to spend in his vehicle, instead of at home or at work, as well as significant frustration by the driver. Furthermore, a longer travel time typically corresponds to a higher utilization of fuel by the vehicle, which in turn corresponds to higher fuel expenses for the driver. Additionally, heavy traffic contributes to an increase in pollution, thereby creating a possible health hazard in some urban areas as well as an environmental problem. Carpooling has been used without significant impact. The other alternative is taxi and public transportation. However, the use of public transportation can be inconvenient if on-demand is needed for a meeting. Taxi is expensive and still requires the user to wait for the pick-up.

Travelers are bypassing the taxi queue with greater frequency, choosing instead ride-sharing services like Lyft or Uber. While taxis, limousines and airport shuttles still dominate the ground transportation business, ride-sharing services are rapidly on the rise among business travelers.

SUMMARY

In one aspect, systems and methods relating to one or more ride-sharing vehicles, each having a driver mobile device in the vehicle to receive a ride-sharing request from one or more riders. The system includes a server coupled to the mobile device, wherein the server receives a group purchase of rides, the server determining first and second riders interested in purchasing rides and establishing a customer-defined group identity with the first and second rider being group members receiving a benefit, and wherein the one or more ride-sharing vehicles provides one or more rides by the first and second customer using the group identity.

In another aspect, a system includes a ride-sharing computer to receive an on-demand ride-sharing request from a rider and an on-demand request to deliver a package, a travel matching module to determine a match between the package and at least one rider, and to generate a carpool proposal directed at a vehicle driver to pool the rider and the package, and a ride-sharing vehicle and with a mobile device coupled to the computer, wherein driver picks up the rider and package based on the carpool proposal.

In another aspect, a system includes one or more ride-sharing vehicles, each having a driver mobile device in the vehicle to receive a ride-sharing request from one or more riders; and a server coupled to the mobile device, wherein the server receives a group purchase of rides, the server determining first and second riders interested in purchasing rides and establishing a customer-defined group identity with the first and second rider being group members receiving a benefit, and wherein the one or more ride-sharing vehicles provides one or more rides by the first and second customer using the group identity.

In a further aspect, a system includes a ride-sharing computer to receive an on-demand requests to deliver the items, wherein the computer includes a travel matching module to determine a match between the package and at least one rider, and to generate a carpool proposal directed at a vehicle driver to pool the rider and the package; and a local demand aggregation network comprising a computer for inviting a set of neighboring users as a group; purchasing with at least a benefit a plurality of items desired by the group from providers of the items; and contacting the ride-sharing computer to deliver items packed in one or more packages; a ride-sharing vehicle and with a mobile device coupled to the computer, wherein driver picks up the rider and package based on the carpool proposal.

In another aspect, a ride-sharing vehicle includes a mobile device to receive a ride-sharing request from a rider, wherein the mobile device retrieves a social network profile from the rider and identifies one or more interests from the rider; and one or more customizable devices in the vehicle configured by the mobile device to match the rider's one or more interests.

In yet another aspect, a system includes a ride-sharing computer to receive an on-demand ride-sharing request from a rider and an on-demand request to deliver a package; a rider with one or more rider vehicle types; a ride-sharing vehicle and with a mobile device coupled to the computer; a rider computer configured to receive a route start point and a route end point; retrieve data relating to a vehicle type for possible use on the route; retrieve data including at least one attribute of each of one or more possible route waypoints; wherein the rider computer determine a cost based one or more route parameters, and wherein the ride-sharing vehicle is selected if it meets a least-cost determination.

In yet another aspect, a ride service network includes computer readable code for storing calendars for a plurality of riders; aggregating vehicle capacity and determining vehicle schedule availability; determining if a selected driver has an open time slot for the user; and scheduling an appointment time; a mobile device to receive a ride-sharing request from a rider, and a ride-sharing vehicle and including the mobile device coupled to the ride service network to pick up the rider.

In another aspect, a mobile device is used to transmit a ride-sharing request from a rider requiring first and second travel segments with first and second starting points and a destination, and a first vehicle proximal to the first starting point, the first vehicle responding to the request, the first vehicle automatically requesting a second vehicle proximal to the second starting point to pick up the rider to deliver to the destination.

In another aspect, a method to provide security for a car driver includes receiving a ride-sharing request from a rider and picking up the rider in a ride-sharing vehicle; retrieving a social network profile from the rider; identifying one or more characteristics of the rider; verifying an identity of the rider based on the characteristics; and providing access to the ride-sharing vehicle upon authenticating the rider.

In yet another aspect, a method to generate credit rating on a person includes receiving a ride-sharing request from a person and picking up the person in a ride-sharing vehicle; retrieving a social network profile from the person; identifying one or more characteristics of the person; generating a credit score for the rider based on the characteristics; and rating the credit score based on a plurality of ride-sharing evaluation of the person from ride-sharing drivers.

In another aspect, systems and methods are disclosed for financing for members of a group by selecting a group of members in a social network; rating each member based on the driver's evaluation and based on social network information to be able to make at least a predetermined monthly payment; forming a social contract with each member to make the predetermined monthly payment to a common fund over a specified term in exchange for receiving an award in a contracted amount at some point during the term; receiving payments from the group of members; and on a monthly basis, identifying at least one member who is eligible to receive an award, and distributing the award to that member.

The system includes a method for transparency on surge pricing. The data on number and location of drivers and riders in real time and an auction is done using an optimal market-clearing model. The rider indicates how much they are willing to pay, and the service provides an estimate of how much of a wait that will give riders, according to how many higher-paying riders are ahead of them. The system gives the rider a choice—wait for an available car, with a predicted queuing time, or bid a surge price to jump the queue. Then it is a true auction with transparency. Riders could even bid below the normal price, if anyone's available off-peak.

The system allows the user to make a reservation hours or days in advance, and let drivers commit to pick up a reservation. Riders have a time and price guarantee, while the ride-sharing service has a valuable signal in advance on demand. And the driver gets predictability. The system provides an opt-in to sync with smart phone calendar and let people choose at the beginning of the day or week which meetings they'd like to advance book trips for. The system can sync with TripIt to figure out when they might need airport rides. With the traffic data, the system could even propose pick up times based on expected travel time, with a user-adjustable cushion. The system also enables the service to provide "Everyone's private driver" as riders can request specific drivers in advance.

Riders add drivers to a favorites list/folder on the Uber App. If the driver is not available, riders can then choose other drivers on their favorites lists or choose any available drivers that is in the area that are not on their favorites list.

The system allows a driver opt-in to a shift, and while they're working, the app tells them immediately what their next pickup is after they've done a drop-off. Passengers aren't left waiting as long for a match in-app—the system can match them with a driver on his or her way to a nearby destination, and bake in the time for the dropoff—and the system avoids the driver having to operate their phone to pick out a person while driving around aimlessly.

The system allows a rider to give some indication of his/her personality type/preference for a preferred level of interaction ensures that riders and drivers alike are more likely to have a positive experience on a given ride. The level of interaction is probably the easiest customization here with the biggest impact, but even things like pulling your favorite music from Facebook and playing a Pandora station based on it would be pretty easy and a pretty cool experience to hop into a car that's playing one of your favorite songs when the rider gets in.

The system also provides local event recommendations to tourists or for a night out. The local recommendations are divided between place recommendations (Yelp, foursquare, 7×7, Thrillist) and event recommendations (Upout, Nudge, YPlan, Sosh, funcheapSF, SF Station, Do415). In one embodiment, the application can be opened with a header says "Looking for something to do tonight?", and when the rider selects it there's a curated list of a couple things, along with discounts offered by those institutions on your ride there. Vendors could price it dynamically to bring more people there earlier in the night versus later, offer extra perks for bringing friends, or pair the ride with a free drink upon arrival.

Advantages may include one or more of the following. The car sharing/riding system improves utilization of a car, which sits idle an average of 22 hours per day while costing owners loan/lease payments, maintenance, parking and insurance The system turns an underutilized, expensive possession into an asset that has a real economic and environmental impact in the community. Each shared vehicle removes approximately 15 personally owned vehicles from the road. (There are 1 billion cars on the road worldwide and 1 car for every 1.3 people in the US.) Manufacturing a new car takes a lot of resources so abstaining from buying one can save from 6-35+ tons of $CO_2$ emissions. Sharing leads to more money reinvested in the local economy, decreased pollution-induced illnesses and improved community health.

BRIEF DESCRIPTION OF DRAWINGS

FIG. 1C shows an exemplary parallel drone delivery and ride-sharing process.

FIG. 2A shows an exemplary user interface for renting/borrowing cars in a shared economy.

FIG. 2B show an exemplary process for crowd-lending a car/vehicle.

FIG. 2C shows the availability of ride-sharing vehicles such as Lyft or Uber near a user's pick up location, while FIG. 2D shows a driver's progress toward the rider and the estimated time of arrival.

FIG. 3 illustrates an example transportation service system.

FIG. 4 shows an exemplary system to customize a car to suit a rider's preference using flexible displays positioned in the vehicle cabin.

FIG. 5A-5D shows an exemplary scheduling architecture.

FIG. 15A illustrates generally, a method for presenting information related to a real-time insurance rate, according to embodiments as described herein, while FIG. 15B shows an exemplary email sent to drivers to provide feedback.

FIG. 16 is diagram illustrates generally, a method for installation of a real-time insurance system, according to embodiments disclosed herein.

DESCRIPTION

As described herein, "ride-sharing" refers to "an arrangement in which a passenger travels in a private vehicle driven by its owner, for free or for a fee, especially as arranged by means of a website or app." Further, "car-sharing" refers to "an arrangement in which a passenger borrows a vehicle belonging to another person and drives the vehicle for a predetermined period and returning the vehicle, for free or for a fee, especially as arranged by means of a website or app." Further, a "user," "rider", or a "customer" refer to individuals that are requesting or ordering an on-demand service. Also, services that "let people use smartphone apps to book and pay for a private car service" are to be called "ride-sharing" or "ride-booking services." Also as described herein, a "driver", "provider," or a "service provider" refer to individuals or entities that can provide the requested service. As an example, a user can request an on-demand service (e.g., car/taxi service, food delivery, messenger service, telegram service, or provide a product) using the system, and a service provider can communicate with the system and/or the user to arrange to perform the service. As used herein, the term "package" is not limited to a parcel, but means any type of good or service being delivered or dispatched by a carrier or ride-sharing service provider. In one embodiment, the package can be a child that needs signed documentation to ensure safe handling of the child. In addition, a "credit score" refers to a rating or expression of a person's creditworthiness that is used by lenders to access the likelihood that a person will repay his or her debts. In addition, as described herein, "customer devices" and "provider devices" refer to computing devices that can correspond to desktop computers, cellular or smartphones, personal digital assistants (PDAs), laptop computers, tablet devices, television (IP Television), etc., that can provide network connectivity and processing resources for enabling a user to communicate with a system over a network.

Figure 1A:
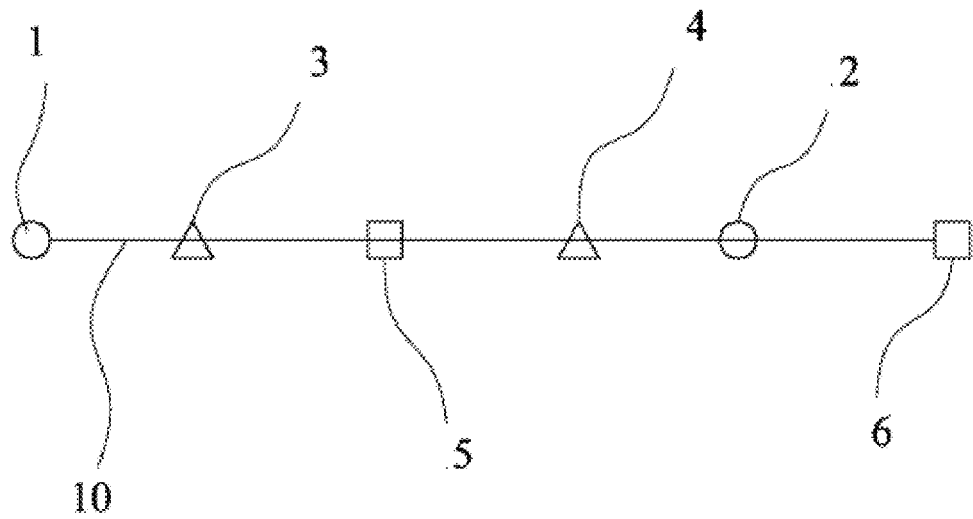
FIG. 1A is a schematic diagram of a route planned by an exemplary transportation system that handles car-renting and/or ride-sharing service and that can perform expedited local delivery of goods/services in addition to people.

A transportation environment is shown in FIG. 1A where the system can transport people as well as goods/services. People can be riders, while goods may be items/packages consigned by a store, and services can be providing or transporting a pet to a veterinarian, for example. In FIG. 1A, the system can treat the rider and the goods/services (collectively passengers) in a route planned by a system 100 (FIG. 3) where a first passenger with an pick-up point (1) and a drop-off point (2), a second passenger with an pick-up point (3) and a drop-off point (4) and a third passenger with an pick-up point (5) and a drop-off point (6), and a route (10) is a union of three optimal routes for the first, second and third passenger from pick-up point (1), (3) and (5) to drop-off points (2), (4) and (6), respectively. The process can identify carpooling possibility by matching sub-segments where people can be picked up and dropped off. Appropriate vehicles are selected that carry passengers with vacancies and have routes such that each route contains the starting point of the optimal route and coincides with every point in the optimal route until the end point of the route, carry passengers without vacancy and have routes with end points near the starting point of the optimal route; or are idle and have positions near the starting point of the optimal route such that user passenger parameters such as number of passengers and vehicle type preferences transmitted by the rider or consignor can be satisfied. Ideally, the riders would not be aware that they are part of a package delivery system, so the system minimizes stops where people have to wait in one embodiment. In another embodiment, when a vehicle is proximal to a package delivery point, a drone is launched to drop off the package at the delivery point and then fly back to the vehicle under the watch of the driver to conform to applicable drone flight regulations. All this is done with minimal disruptions to the human driver and rider(s).

Figure 1B:
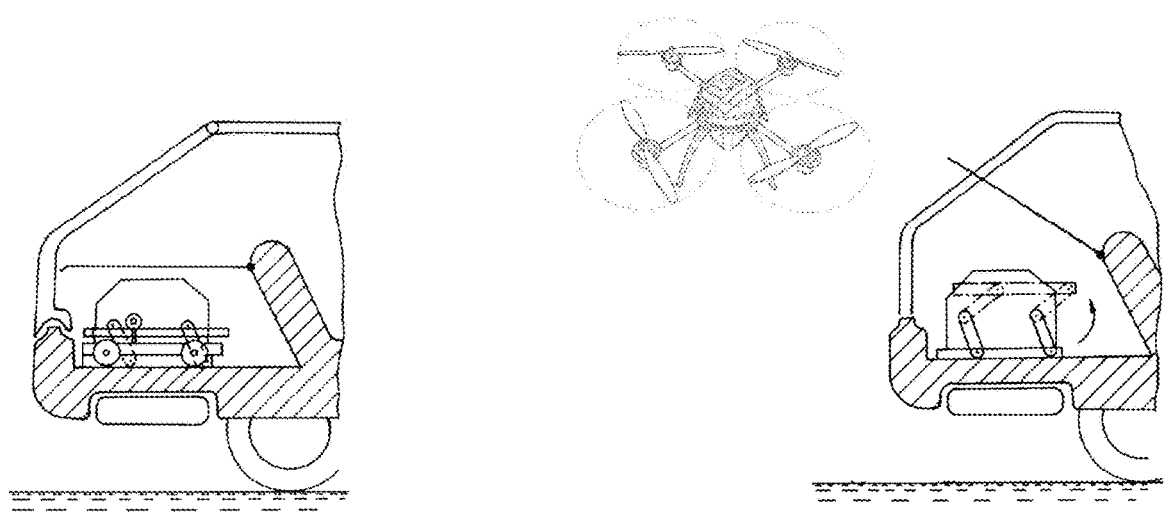
FIG. 1B shows an exemplary drone carrier portion of a ride-sharing vehicle.

FIG. 1B shows an exemplary drone carrier that also performs ride-sharing. Each vehicle has a landing area where the drone can take off and land. The drone uses a coordinated control strategy with the car computer for autonomous docking. Converging on a pre-set location, the drone vehicle communicates its position to a decentralized controller on the car. This controller accounts for nonlinearities in the vehicles' paths, catering for various factors, such as strong winds and time delays from Wi-Fi or radio signals. Local controllers to feedback linearize the models can be used, and a joint decentralized controller is used to coordinate a rendezvous for the two vehicles. The effects of time delays on closed loop stability are examined using a Retarded Functional Differential Equation formulation of the problem, and delay margins are determined for particular closed loop setups.

FIG. 1C shows an exemplary drone deliver process as managed by a driver of a ride-sharing vehicle. The process includes:
  Identify all packages and rides to be handled by car
  Each package contains a drop coordinate for drone destination
  Optimize paths for car pooling and delivery segments
  Group package pickup and rider pickup for optimum path plan
  Deliver riders first if possible to minimize inconvenience
  When near the drop coordinate, open drone carrier and launch drone
  Car continues on path and sends current GPS coordinate to drone
  Drone flies to drop coordinate, delivers package and flies back to car
  Drone lands in carrier and door is closed to secure drone while riders are delivered In accordance with one aspect of the present invention, an entire hierarchical spectrum of multi-autonomous control modes are made available to the driver as a system operator. The driver is illustratively able to efficiently and smoothly change control modes mid-mission as desired. The driver can do much more than simply change, edit or adjust waypoints on a waypoint-following mission. A driver can interrupt a waypoint-following mission to guide the vehicle manually, or partially manually (e.g., remote directional commands), or based on sensor/remote line-of-sight command control. In accordance with one embodiment, the control system is configured to optionally transition back to an interrupted mission (e.g., back to an original waypoint-following mission). It should be noted that the "operator" is not necessarily human. For example, the driver could be an automated decision-making source. The spectrum of control modes available to the driver illustratively corresponds to the particular functional sub-components incorporated into a variable autonomy control system architecture. In accordance with one aspect of the present invention, in addition to numerous specific control modes that will be described within the present description, a spectrum of additional control modes are conceivable. The control systems of the present invention can be easily configured to support (including conflict and transition support that enables the driver to switch back and forth between modes) basically any control mode or module. Examples of such control modes include:

1. Driver inputs a planned route and then the control system autonomously chooses a vehicle (e.g., one of several available vehicles) and automatically guides the vehicle along the planned route . . . or driver designates a moving ground target and then the control system autonomously chooses a vehicle and automatically guides the vehicle to track the ground target
2. Driver provides a planned route for a specific vehicle before the vehicle is launched . . . the vehicle follows the pre-planned route
3. Same as #2 but driver is allowed to change to a different planned route post launch (e.g., ability to change missions)
4. Control based on a vector-based decision process (e.g., vehicle will head in a predetermined direction at speed x, altitude y, etc. . . . then turn based on new vector input information
5. Remote Directional Control (RDC) control (e.g., flying directionally such as with a multi-directional joystick input mechanism . . . with autonomous safety nets that do not let the driver aerodynamically stall, over-steer, overbank, or otherwise compromise flight of the vehicle)
6. Full Manual Control (remote commands which directly reach the control surfaces un-compensated or conditioned)

Accordingly, the control systems enable an driver to move in and out of a range of different control modes selected from a broad control spectrum including everything from automated mission planning to direct control, with many available modes in between. Modes other than the six listed above are certainly within the scope of the present invention. Software products for automatic route planning are commercially available and can be implemented in the context of the described control system and architecture. For example, OR Concepts Applied (ORCA) of Whittier, Calif provides at least one software product for route planning such as their "ORCA Planning & Utility System" (OPUS). This is but one example of a software component that can be utilized to extend the functionality of the broader control system.

The system planning ride-share routes for vehicles plans a route for each vehicle such that the planned route is a union of the original route of the chosen vehicle, the optimal route and, if the vehicle is carrying passengers without vacancy or is idle, a route connects the end point of the original route and the starting point of the optimal route. Information such as boarding time, boarding position, number of vacancies, vehicle license number, transportation fee, etc. to the passenger internet devices and the planned carpool route, passenger pick-up points, drop-off points and parameters are sent to the vehicle.

Other features of the system can include one or more of the following. The system provides transparent bidding for vehicles, car rental/borrowing, rideshare matching, and/or package delivery. The system can also support delivery of Item Lending, or in case of a Group Purchase, the Delivery with Ride-sharing. The system can open up access to the mass to provide a virtual business fleet for businesses that want to pamper customers/clients with custom pick-up and delivery services. The environment of the vehicle cab can be changed to provide a Customizable Taxi or Ride-Sharing Environment. The system can provide On Demand ride sharing and for large events such as a concert, can provide Scheduled request for delivery. The system can provide automated buffering of vehicles for expected large events. Rider sharing can be done with multiple modes of transportation, for example, borrowed car services and services in the shared economy. The system enables rapid security checking, and can apply the driver as a human assessment in conjunction with a credit rating of people being driven and the credit rating with personal assessment by one or more drivers. The system can use peer-to-peer wireless systems to automatically discover riders with same shared interests. Ride share Protection for People and Asset is provided and such systems can allow discrete dating that is safe and lasts as long as desired. The system can be used for financing purchases of vehicle by being part of driver pool.

In some implementations, a ride-sharing system includes an on-demand service application, a map component, a map database, and a location determination. The components of system 100 can combine to provide user interface features that are specific to user selections, user locality, and/or real-time conditions to enable a user to request on-demand services. The on-demand service application can correspond to a program that is downloaded onto a smartphone, portable computer device (e.g., tablet or other ego-aware device). In one implementation, a user can download and install the on-demand service application on his or her computing device and register the computing device with an on-demand service system of the entity. The application manager can receive user input, location information 147 and other information (such as user information and/or historical information) to configure content that is to be provided by the UI component 120. For example, the UI component can cause various user interface features to be output to a display of the computing device. Some of the user interface features can be region-specific (e.g., based on the current location of the computing device) to display information that is particular to the region. The user interface features can also provide dynamically adjusted content based on user selections provided via the user input.

The location determination can determine the location of the computing device in different ways. In one example, the location determination can receive global positioning system (GPS) data from location-based/geo-aware resources of the computing device. In addition, the location determination can also receive GPS data from other applications or programs that operate on the computing device. As an addition or alternative, the on-demand service application can determine the user's current location or pickup location (i) by using location data provided by the on-demand service system, (ii) by using user location input provided by the user (via a user input), and/or (iii) by using user info and/or historical info stored in one or more user databases.

The on-demand service application can provide location information to the on-demand service system so that the on-demand service system can arrange for a service to be provided to a user (e.g., arrange a transport service or an entertainment provider service). Based on the user-specified region, the on-demand service system 170 can provide information about available service providers (e.g., drivers, or mariachi bands) that can perform the on-demand service in that region. For example, for a transport service, a transport on-demand service system 170 can maintain information about the number of available vehicles, the number of available drivers, which drivers are currently performing a transport service, which drivers are ready to pick up users, the current location of the vehicles, the direction and destination of the vehicles in motion, etc., in order to properly arrange the transport service between users and drivers. In another example, for a food service, a food on-demand service system 170 can maintain information about the different food trucks that are available, where the food trucks are, how long a food truck will be at a particular location, what type of foods are being served, etc. Because services can vary between regions, such as cities, the application manager can cause only information pertinent to the user's specific region to be provided as part of the user interface.

Using the information maintained about the services and the service providers, the on-demand service system can provide relevant information to the on-demand service application. Service information can correspond to information about the particular on-demand service that can be arranged by the on-demand service system (e.g., food services, delivery services, transport services, telegram or entertainment services). Service information can include information about costs for the service, available service options (e.g., types of food available, types of entertainment, delivery options), or other details (e.g., available times, specials, etc.). Provider information can correspond to information about the available service providers themselves, such as profile information about the providers, the current location or movement of the delivery vehicles, transport vehicles, food trucks, etc., or the types of vehicles.

After the user confirms the request for the on-demand service, the on-demand service application can provide the service request to the on-demand service system via the service interface. In some examples, the service request can include the service location specified by the user (e.g., the location where the user would like the service to be performed or provided), the user's account information, the selected service option, any specific notes or requests to the service provider, and/or other information provided by the user. Based on the received service request, the on-demand service system can arrange the service between the user and an available service provider that is qualified and capable of providing the on-demand service. The on-demand service system can provide additional provider information to the on-demand service application, such as the particular service provider who will be fulfilling the service, the service provider's ratings, etc., so that this information can be provided to the user on a user interface.

FIG. 2A shows an exemplary user interface for renting/borrowing cars in the shared economy. The UI shows cars available for rental (A) and motorbikes available for rental (triangle). The system of FIG. 2 differs from that of FIG. 2B or 2C in that the vehicles are stationary and it is the user that is walking toward the vehicle to pick the vehicle up. In contrast, in FIGS. 2B-2C, the rider is stationary and the ride-sharing vehicles come to them. The system shows Uber/Lyft vehicles on the map so that the user can decide on renting or ride-sharing. In FIG. 2B, the process for crowd-lending a car/vehicle is as follows:

Owner registers vehicle (40)
If not smart car, install Immobilizer hardware (42)
If the vehicle needs to be located due to an emergency, the system can access its coordinates (44)
Owner can designate a boundary for the vehicle (44)
Renter registers and credit worthiness is assessed and periodically updated (48)
Renters use a mobile app or call a Call Center to access the rented vehicle during a reservation (50)
After credit approval and rental check out, navigation software sends GPS location and walking instruction to renter to access vehicle (52)
Renters who go beyond boundary area will receive alerts (54)
If the vehicle is stolen, or taken outside of a designated area, the system has the ability to notify the authorities of the vehicle's location and immobilize it (56)

When activated, the immobilizer can alters a static code in a key fob and recognized by an RFID loop around the lock barrel and checked against the vehicle's engine control unit (ECU) for a match. If the code is unrecognized, the ECU will not allow fuel to flow and ignition to take place. They can use rolling codes or advanced cryptography to defeat copying of the code from the key or ECU. The microcircuit inside the key is activated by a small electromagnetic field which induces current to flow inside the key body, which in turn broadcasts a unique binary code which is read by the automobile's ECU. When the ECU determines that the coded key is both current and valid, the ECU activates the fuel-injection sequence and the car is drivable. Otherwise the car is disabled.

As an overview of the embodiments that are described more particularly with reference to the FIG. 2B, consider the following scenario that utilizes the car rental checkout service. A customer is directed to walk to a specific GPS coordinate by the mobile application on the customer's phone and communicating with a car rental checkout service. It may also be that the customer has an itinerary already that indicates a GPS location or where the customer's car is located. The car rental checkout service instructs the customer to frame the VIN on the car in a receptacle displayed by the mobile app. Alternatively, a text message sent by the car rental checkout service tells the customer to active the customer's bar code scanner on phone and to the scan the VIN. It may also be that a picture is taken if the phone does not have a native bar code scanner. At this time, the mobile app on the phone or the car rental checkout service recognizes either the barcode or characters that comprise the VIN, and records that the customer is taking possession of this car particular car with this VIN. Here, the mobile app can send the VIN to the car rental checkout service or the customer can be instructed to send an image of the VIN to a particular number monitored by the car rental checkout service. The car rental checkout service then remotely unlocks the car through OnStar® or similar auto management infrastructure based on verification of the reservation.

Next, the customer is instructed (via the mobile app or text messages sent by the car rental checkout service) to perform a walk-around of the car with the camera of the phone framing the car as a 360-degree video or a as series of still images. The app or car rental checkout service stores the images, location and time as a video record of any pre-existing damage to the car. In the case of the app storing, the app sends to the car rental checkout service on behalf of the customer. Without the app, the customer is instructed to send to a number monitored by the car rental checkout service or instructed to upload to a predefined site monitored by the car rental checkout service. Next the customer is instructed (via text messages or the app in communication with the car rental checkout service) to start the car and frame the dash-board in the app provided receptacle (or using the phone's camera application). The mobile app or the car rental checkout service recognizes the car's fuel gauge and odometer readings through optical recognition software and notes these values along with the location and time of the photo and confirms the value with the customer. In the case where there is no mobile app, the car rental checkout service instructs the customer via a text message to send the image of the gauges via a text to a phone number monitored by the car rental checkout service or to upload the image of the gauges to a site monitored by the car rental checkout service. For added security, the customer may also be asked to enter, via an app or via a text message sent, the license number of the customer.

The car rental checkout service records the images or video to establish a record for the car rental transaction between the car rental owner and the customer. If a mobile app exists, it may automatically retain the images for the customer on the wireless portable device as well should a dispute about preexisting damage arise when the customer checks the car back in after the car rental period. Alternatively, the customer can be informed via a text message to the wireless portable device to retain the images or video for the customers on records should a later dispute arise.

The car rental checkout service sends the record to a car rental management system to obtain confirmation details for a confirmation permitting the customer to exit the car rental facility with the car. The car rental checkout service sends to the wireless portable device a confirmation that indicates that the customer can now drive the car to complete the car rental checkout transaction. Thus, an entirely unmanned car rental can be facilitated using the techniques described herein.

One example of a ride-sharing service is Uber or Lyft, where pickups are made on demand and drivers arrive within minutes. The drive can also be scheduled in advance to facilitate group events. As shown in FIGS. 2C-2D, the Uber app will show the rider approximately how far away the closest driver is so the rider can request his/her pickup at a time that fits his/her schedule. The fare is calculated based on distance and time. For Uber, a typical driver cycle after pick-up: 1) drive passenger to destination; 2) drop-off, mark as dropped off in app; 3) drive around, wait for ride request; 4) opt-in to select that person for pickup; 5) go pick them up, and then back to step 1. While drivers prefer to have a passenger in their car for the highest percentage of their time on the road, and steps 3 and 4 hinder that ability. The vast majority of services that Uber and Lyft and others provide mimics a traditional taxi or driver service. For car-pooling using ride service, a rider map database is searched for potential matches to the route and other criteria submitted by the rider. The software may begin the searching process by finding riders who travel the same or nearly the same route. In one embodiment this is accomplished by comparing the route nodes and vertices of one rider to those of another rider route to find compatible riders. For example, a first rider route having ten road segments is compared to a second subscriber route having nine road segments. Upon comparison of these two routes it is found that eight of the segments are common. In this example, the second subscriber would be added to the list of potential subscribers to be sent to the subscriber seeking a carpooler. In one embodiment, the percentage of nodes that are in common with the subscriber's route may be a parameter taken into account when compiling the list of potential ride sharers. For example, a first rider may be willing to accept a list of riders that have routes with eight of ten matching segments but a second rider may only accept a list of ride sharers having all ten matching nodes. After a list is generated containing riders with the same or similar routes, the system may next compare the preferences of the subscribers to generate the list to be sent to a particular subscriber. The list may include those other subscribers that do not fit a subscribers profile completely but may be within a certain degree of variance. Upon the completion of the searching, the list of ride sharers are sequenced and the paths generated and transmitted to the driver of the ride-sharing vehicle. The driver may then retrieve the transmitted list or may be notified by electronic mail or may be notified by an audible message sent to the vehicle and broadcast via the mobile device so for pick-up of the riders.

In some embodiments, a customer can transmit a request for transport from a given customer geographic location. A service may handle the request by selecting a party to provide transport to the customer. According to some embodiments, the pairing of the party to the customer requesting the transport is performed programmatically and/or automatically, based on parameters such as the location of the driver (or a vehicle of the transport party).

According to embodiments, individual drivers may be selected as respondents to a customer request, whom in turn have the option to accept the assignment. Once a driver is selected and has accepted the assignment, information about the driver (e.g. the location of the driver when the fare was accepted, a picture of the driver, his rating etc.) may be communicated to a device of the rider. The driver may also be provided information about the rider (e.g. the picture of the rider, the rider's safety rating, the rider location or pickup location). Additionally, some embodiments provide that the customer is provided updates as to the location of the vehicle of the driver en route to the customer. The updates may be provided in real-time or near-real time, to reflect the progression of the driver towards the customer.

Rideshare Device

An overview of a transportation system 100 is shown in FIG. 3. The passenger can be a biological entity (human or animal) or can be an object or consignment. In one embodiment, ride-sharing can be used and the rideshare can include a transaction between a driver 102 and a passenger 104 that results in the transportation of the rideshare participants 102, 104 to a destination 106 along a route 108. In another embodiment, the passenger can rent a local vehicle (car sharing) after entering into a transaction with the car owner that results in the transportation of the passenger to the destination 106 along the route 108.

The driver 102 provides transportation using a vehicle such as an automobile 110. Other forms of transportation may be provided, such as airplanes, trains or vans. Each participant 102, 104 (or animal/object owner) has available to him or her a rideshare device 112, 114. The rideshare device 112, 114 has communication capabilities and a location determining capabilities. Moreover, each participant 102, 104 has access to a plurality of modes of transportation. For example, the participant 102, 104 can have motorcycle, bike, owned car, borrowed car, boat, plane, glider, among others. Each of the mode of transportation can have its own costs and requirements. The system 100 can optimize the cost and recommend a combination of modes to best reach a destination. For example, in the city, Uber or Lyft may be the most convenient and cost-effective. However, if the rider wants to go to a remote area for sight seeing, Uber or Lyft may not be cost-effective and a combination of ridesharing with borrowing a vehicle to drive to remote areas may be effective. The borrowing of the vehicle may be from a conventional car rental company, or may be from the crowd. One such service is ZipCar where the user can book a Zipcar for a couple hours or the whole day. When the time is almost up, the rider can return the car to the same reserved parking spot. The rider can also borrow car from the local population. To ensure that riders come back with the car, the system can do a preliminary charge to the rider's credit card account to ensure fund availability. The system also checks the rider's credit worthiness as described below.

The rideshare device 112, 114 communicates with a location broadcast station 120 and a communication broadcast station 130. Commonly, the location broadcast station 120 is a satellite, such as a global positioning system. Examples of communication broadcast stations 130 include cellular towers, WI-MAX broadcasters, WiFi broadcasters, walkie-talkie and other forms of radio communication. The location broadcast station 120 and the communication broadcast station 130 may be combined into any convenient form, satellite or terrestrial. The participant device 112, 114 includes, or has access to, a location system such as GPS or other locating strategies. Similarly, a cellular telephone, or similar device, can be located by triangulating communication signals 132, 134 originating from the device 112, 114 received at a plurality of broadcast stations 130.

A rideshare system 160 interfaces with the rideshare devices 112, 114 through the communication broadcast station 130. The rideshare system 160 arranges and administers a rideshare transaction between a driver 102 and a passenger 104. The rideshare transaction occurs along a route 108 starting at an origin 105 and concluding at a destination 106. As discussed below, the rideshare system 160 determines a driver location 170 using the location capabilities of the driver device 114. The driver location 170 may be the origin 105 or any point along the route 108 as the vehicle 110 is in transit. A pickup location 172 is determined from the location capabilities of the passenger device 112. The application 172 need not be the actual location of the passenger device 112, for instance a safer nearby pickup location may be specified by the rideshare system 160. Safety functions provided by the rideshare system 160 include the monitoring of a trip location 174 as the passenger 104 shares the transport 110 with the driver 102.

The rideshare system 160 may be used in a number of transportation contexts and locations. For example, the rideshare system 160 may support commuting in different metropolitan areas within the same or different countries. A rideshare support system provides a localization module that may provide directions and instructions translated for, or otherwise tailored to, a particular location. A map module provides transportation maps, for example roadmaps of the transportation coverage area administered by the rideshare system. Navigation systems support provides navigation functions such as driving directions and may be interfaced with location determining systems such as GPS or the location determining functions of the participant devices 112, 114. In another embodiment, cars from locals can be borrowed or rented for a fee. In this system, smart cars are used as rental vehicles with keyless entry, and secure vehicle monitoring and operation solution. The system has GPS tracking, remote immobilization, keyless operation, geofencing. There is no need to hand over the keys. Renters can use a mobile app or call a Call Center to access the rented vehicle during a reservation. The navigation software will help get renters to the destination. If the vehicle needs to be located due to an emergency, the system can access its coordinates. The car owner can designate a boundary for the vehicle. Renters who go beyond this area will receive alerts. If the vehicle is stolen, or taken outside of a designated area, the system has the ability to notify the authorities of the vehicle's location and immobilize it.

Transparent Bidding

In one embodiment, each member knows the others' bids as transparency is an important feature of the system. The system shows only the current winning bid and number of bids so far and ending time. Moreover, it also should allow members for bid at the last seconds. Biddings can be Closed bidding vs. Open bidding. In Closed Bidding, the members should send a bid message to the organizer who will announce the winning bid number, but that takes away the competition for money in the Open Bidding process that will benefit all members. Open Bidding will drive the winning bid down and the winner will be the person who needs the ride the most in the bidding cycle, and that person is willing to pay the highest.

Carpooling Matching System

To decrease cost and save the environment, carpooling can be done. A carpool match transaction system generally includes functions for matching participants 102, 104 in a rideshare transaction. A rideshare security module tracks and monitors the participants 102, 104 during the rideshare transaction. The carpool match transaction system may utilize the participant devices 112, 114 to arrange a rideshare transaction and also to track and monitor participant security via the carpool security module.

In a ride-share embodiment, an accounting system provides functions for the monetary and non-monetary administration of the rideshare system, for example, tracking and accounting for: rideshare transactions; financial negotiations for rideshare between participants 102, 104; fees and commissions that may be taken by the rideshare system 160; revenues generated by the rideshare revenue business methods; expense allocations; and, rideshare participation incentives. Rideshare revenue business methods provide profit and financing alternatives for the rideshare system. Participants 102, 104 can also be matched by a social network component using social network information maintained by either the rideshare matching transaction system or third party social network systems. For example, a driver 102 may wish to only be matched to passengers 104 identified as friends (first degree relationships) or friends of friends (second degree relationships). A participation-scoring component may maintain information documenting the participation of the participants 102, 104. The participation information may include such values as the number of successful rideshare transactions that the participant has participated in, feedback scores from other participants that have participated in rideshare transactions with the subject participant or recommendations from other rideshare participants.

The shared interest-scoring component determines and compares either or both biographic or behavioral information. Examples of biographic information might include gender, age, hobby, profession and music preferences. Examples of behavioral information might include smoking or non-smoking preferences. The participant match component 330 may utilize information other than that directly associated with a participant. For example, a vehicle information component may obtain and utilize information pertaining to the characteristics of the vehicle 110, such as vehicle size, number of available seats, insurance safety ratings and the like. Vehicle maintenance and safety inspections are other examples of information associated with the vehicle 110 that may inform a participant 104 directly, or the participant match component 330 automatically, to arrange a rideshare match transaction. The participant match component also provides for a preferences component, which may require, or give preference to, certain participants or classes of participants. For example, priority may be given to corporate sponsored users, participants with nearby home or work locations, participants with good participant ratings, or participants with certain group associations.

The carpool match component includes systems and methods for the transportation specifics of the rideshare transaction. A route match component determines a route 108 that corresponds to a location 170, a proposed pickup location 172 and a destination 106. To coordinate a route 108 that meets the criterion of the ride location 170, the pickup location 172 and the destination 106, the route match component may determine a suitable route with a route-planning component. A pickup and drop-off alternatives component may suggest an alternative pickup or drop-off location that complies with route planning objectives, such as choosing routes with consideration for the safety of the participants, as is discussed in more detail below. The ride match component may also undertake the negotiation of elements that the participants may be flexible with, for example negotiating the time of pickup using a time negotiation component. The carpool matching transaction system may also include a financial negotiations component, whereby the participants negotiate compensation for the rideshare transaction. For example, a ride auction component may administer bidding between one or more passengers 104 for a seat in a vehicle 110 along a particular route 108. The carpool matching transaction system may also take into account rideshare participation incentives administered by a rideshare participation incentives component.

Package Delivery Service

The system can provide one-hour package delivery in conjunction with a ride-sharing service. For example, if the system has picked up a rider already and now receives an instruction to pick up and deliver a package, the system allows the route planning user/driver to designate detour data to pick up the extra rider (in case the driver was assigned to pick up/deliver the package) or vice versa. In this case, the route planning apparatus will add road path data corresponding to the driver detour data for all desired routes to be calculated between any start and destination locations for routes to handle the package and the rider. Also the system can treat package delivery as though the package is another car pool passenger using the ride-sharing service such as Uber or Lyft. In carpooling embodiments, frequently travelled locations (e.g., origins and destinations) or routes (e.g., road segments) may be derived by collecting GPS points from the community members' smart phone devices. A route analysis module analyzes each travel record, and identifies the relevant starting and ending points of the travel, as well as departure and arrival times; the identified data is then allocated to the profile of the relevant user. The accumulation of similar close-by geographical locations is analyzed and associated with potential daily routine visit places or possible common routes (e.g., home to work in the morning; work to home in the evening; home to beach on Saturday morning; beach to home on Saturday afternoon). Optionally, the user may be prompted to confirm a hypothesis about the various locations, time of travel, or other attributes (e.g., weekly frequency) of an identified route.

In some embodiments, the method may include, for example, determining a first travel pattern associated with the first user and a second travel pattern associated with the second user, determining a match between the first and second travel patterns and generating a carpool proposal directed at the first and second users. Note that the user can be a rider or a package to be delivered.

In some embodiments, the information provided to carpool participants may further include, for example, potential cost saving (e.g., gas expenses, car-related expenses, public transportation expenses, parking expenses, transportation tolls, road tolls, bridge tolls, tunnel tolls, ferry tolls, highway tolls, or the like), estimated time saving (e.g., based on typical velocity of cars in a HOV lane versus a non-HOV lane), as well as other suitable information which may promote the service and/or provide benefit to the user. These information items may be calculated by a benefits calculation module, which may optionally utilize manually-updated or automatically-updated information (e.g., gas prices).

One embodiment allows one hour delivery of purchases. Another embodiment allows same day delivery of purchases. In these embodiments, a store or consignor has packages to be delivered at a particular time as ordered by a customer or consignee. The delivery time may impact the delivery cost. For example, during non-peak traffic, the cost can be less. During peak traffic or inconvenient time such as mid-night, the delivery cost can be increased. The delivery cost is provided to the store based on the customer selection as part of the check-out by the customer.

At a high level, the customization or the personalization of the delivery experience may require or involve the coordination between the:

(1) ride-sharing carrier and the consignee,
(2) consignor and the ride-sharing carrier, and
(3) consignor and the consignee.

Communication between the carrier and the consignee may facilitate delivery by the entities agreeing on a time and/or place to accomplish delivery. In the second scenario, the consignor may request the carrier to alter the delivery address for the package. And, in the third scenario, the consignor and the consignee may agree between themselves to modify aspects affecting delivery of the package and inform the carrier of the change (which then may involve the first or second scenarios). Thus, in many instances, communication in one of the aforementioned scenarios (e.g., between the consignor and the consignee) may be followed by another instance of coordination (e.g., involving the consignor and the carrier). For example, a consignee may notify the consignor of a change of address after the consignor has already shipped the package, but before delivery has been accomplished. The consignor may then communicate the new address to the carrier.

As it will be seen, the first two instances of coordination involve the carrier in some form and impact how or when the carrier accomplishes delivery of the package. In many cases, the impacts to the carrier are highly dependent on the particular facts surrounding the package delivery. For example, a consignor contracting for the delivery of a package may require a signature by the consignee, and only the consignee. This may preclude a request by the consignee to deliver the package to a neighbor instead. Of course, if the consignee communicates with the consignor, the consignor may in turn authorize the carrier to deliver the package without a signature of the recipient, effectively waiving the signature requirement. Because various communications and combinations of coordination are possible, only some examples are provided to illustrate various embodiments of the invention.

At a high level, the communication between the carrier and the consignee typically involves the exchange of information to coordinate, or personalize, the package's delivery. Typically, although not required, the consignee is aware of an impending package delivery. This may occur via several ways. In one common embodiment, the carrier may notify the consignee of an impending delivery. This can occur via an email notification, although other forms are possible, including other forms of electronic messaging (e.g., short message service, automated voice telephone calls, facsimile messages, hosted web site messaging, instant messaging, etc.). In other embodiments, the consignor may notify the consignee that a package has been shipped. This is quite common in situations in which the consignor is a merchant from whom the consignee has ordered an item and the consignor provides notification when the package has actually been handed off to the carrier. Typically, the consignor will also provide the consignee with a tracking number of the delivery. In other embodiments, the consignee may be expecting a package based on other facts (e.g., the consignee ordered merchandise and was expecting delivery). In this case, the consignee may proactively access a package tracking web site operated by the carrier to ascertain the status of the package delivery.

Typically, once the consignee is aware of an impending delivery, the consignee can initiate a request for personalizing the delivery of the package. The consignee may communicate the request in different ways, including electronic messaging, such as via email or web-site access, via telephone, or other forms. The request typically provides information to the carrier that the delivery personnel use in the delivery of the package. Such information may include identification of the package (e.g., via a tracking number), requests regarding when the package should be delivered on the day of delivery, where it should be placed at the delivery address, or other special handling information.

Although personalized delivery information is often provided after the consignee is aware of the existence of a package that will be delivered, this information can be also provided earlier. Specifically, a consignee could indicate delivery preferences or instructions prior to a package being shipped to the consignee. For example, personalized delivery information can be provided by the consignee as standing instructions or preferences for delivery of a package. Thus, the delivery preference is to be applied to all future deliveries, even if there is currently no package scheduled for delivery to the consignee. In other embodiments, the delivery information may be provided after the initial delivery attempt. While the carrier may prefer to receive such information prior to an initial delivery attempt, embodiments of the present invention contemplate indication of delivery preferences by a consignee before and/or after an initial delivery attempt.

Similarly, a consignor can provide personalized delivery information to the carrier. In some embodiments, the indication of such information may be made by the consignor contemporaneously with the indication of other related package delivery information. A typical circumstance is a customer ordering information from a merchant using web-access, and when placing the order the customer (which typically is the consignee) requests that the items be placed at a certain location upon delivery (e.g., the back door). Upon shipping the package, the merchant may indicate to the carrier the destination address with special instructions regarding the delivery, including placement at the back door. This information could be included with other shipping information provided by the consignor to the carrier via a shipping system. Such shipping systems allow a consignor to prepare packages for shipping.

In another embodiment, the customer may notify the merchant of the special delivery instructions, after the package has been shipped. In that case, the consignor (the merchant) may communicate the special delivery instructions to the carrier by referencing the package or the consignee. Alternatively, and as discussed above, the consignee could indicate such directly to the carrier after learning of the impending delivery.

In other embodiments, the consignor-provided personalized delivery information could originate from the consignor itself, rather than from the consignee. For example, the consignee may know that it is shipping goods which could be damaged if wet, and thus provide delivery instructions indicating that if the package is left at the consignee's delivery address without the consignee being present, the package is to be wrapped or covered in plastic. As another example, the consignor may require that all consignees provide "live" or in-person signatures for release of a package, and would provide this information as a standing delivery preference to the carrier.

The communication between the consignor and the consignee, by itself, does not involve the carrier and does not directly impact the delivery of the package. However, a typical result of this communication is that the consignor or consignee will then communicate personalized delivery information to the carrier regarding the package delivery. It is possible that one party may expect the other to contact the carrier, or may facilitate the communication so as to ensure the communication is as seamless as possible. For example, a consignor may communicate with a consignee and learn that the consignee will not be able to receive the package. The consignor may provide the consignee with a web-address of the carrier and the tracking number of the package as well as instructions of how to inform the carrier of this situation. Thus, the consignor facilitates the consignee in indicating his personalized delivery information to the carrier. Alternatively, the consignor could inform the carrier of the situation directly, after which the carrier can contact the consignee and inform him that his delivery preferences have been communicated. The consignor may have obtained the email address of the consignee (such as at the time the consignee placed the order with the consignor), and may provide this to the carrier for purposes of allowing the carrier to communicate shipping status information to the consignee.

Upon receiving payment for the order, the store, restaurant, or vendor computer sends the customer address to the rider hailing server to analyze package delivery locations and deliver routes, determine when a ride-sharing vehicle may be able to combine its trip serving riders and in the same trip deliver the package to the customer location, and match the delivery time. Preferably, the rider is delivered to his/her destination without knowing that there is a package to be delivered in the same trip to minimize inconvenience to the rider. Based on these considerations, the rider hailing server selects one of the drivers, and informs the store and/or the customer of the delivery vehicle and time.

The rider sharing server may build delivery routes corresponding to customer delivery locations based off of traffic patterns and road types and based off of existing and potential customer orders and rider orders to create efficient delivery routes. For each predetermined delivery route start time, the ride hailing server may have a predetermined cutoff time when orders may no longer be placed for delivery by that delivery vehicle. A time period such as an hour may be provided between the cutoff time for a delivery route/vehicle and the start of that delivery route.

The store computer may add additional information for each delivery order. The store server may add a delivery time window, an order identification number, customer information, customer address, customer specific instructions, past customer complaints, etc. to the delivery location information. The store server may thus create an information rich delivery route which may then be provided to the driver for delivery in the time window and in the manner desired by the customers.

In one example, a store may include an order fulfillment computer and one or more mobile devices. The order fulfillment computer may streamline the collection of items from the store. The order fulfillment computer may include a layout of the store indicating which types of items are found on the various isles in the store. The order fulfillment computer may store information regarding where different commodity groups or product types are located throughout the store. The order fulfillment computer may store a product picking route which directs a store employee through the store in a predetermined manner.

The order fulfillment computer may receive a customer order and arrange the items on the customer order so that the items are encountered sequentially in the store as a store employee follows a predetermined picking route through the store. The order fulfillment computer may receive a number of customer orders associated with a delivery route and may combine items from all of the orders into a single pick list, allowing a store employee to follow a pick route a single time through the store to collect all items for all of the orders. The order fulfillment computer may divide the items into a few different groups. For example, the order fulfillment computer may divide the order items into a group of frozen items, a group of refrigerated items, and a group of non-cooled items.

In one embodiment of the present invention a vehicle route planning system is provided. The system includes a map database which stores fixed road path data corresponding to the roadways which exist at least between start and destination locations.

The map database stores the map data along with various facilities including gas stations, restaurants, hotels and shops, which is accompanied with the map data. The map data includes a road network for representing the road of the map as a line. The intersection is defined as a node. The road is divided by the nodes into multiple sections. A section between two nodes is defined as a link. Thus, the map data includes link data for presenting a link and node data for presenting a node. The link data includes a link identifier of each link as an identifier of the link, a link length, position data of a starting point (i.e., one node) of each link and an end point (i.e., the other node) of each link, an angle (i.e., a direction) data, a width of a road, a type of a road and the like. The link ID is specific to a corresponding link. The position data of each node includes a longitude and a latitude of the node. Further, the link data includes information for displaying (i.e., reproducing) the link on the map.

The driver may have a number of delivery packages to select from, and the system presents the driver with a list of vendors, stores restaurants within a given distance (which may be radial, driving time, or driving distance . . . ). For each package not along the driver's route, user interface module displays two distances: the distance down the route to a point from which the driver would deviate toward the package pick-up (the "along-route distance" to the "route departure point"), and the distance by which the pick-up is off the route (the "off-route distance"). Alternatively, the driver can configure system to display the estimated time off-route caused by the deviation based on information stored in database about the detour to pick up the package, including for example the estimated speed along the off-route portion. In this example, the delay is about two minutes. The driver decides that the two minutes is an acceptable time, and therefore deviates to pick up the package.

Preferably, the ride-sharing vehicle combines a trip serving riders and also deliver the package to the customer location with the targeted delivery time without delaying the rider for the package delivery in the same trip to minimize inconvenience to the rider. This is done by determining if the package can be delivered after the rider has been dropped off. If this is not possible, the system would rejected the current rider request or the current delivery request to avoid time conflict. In one embodiment, if there is a time conflict, the system flags a second driver to pick up the package for delivery, while allowing the rider to travel to the destination in the most convenient manner.

Dating/Socializing

The system can be used for safe on-line dating and then in person meeting. The members of a dating site can socialize with each other using a dating site, for example. The dating site can provide profiles of members for on-line dating including pictures and a social networking profile. The system can track the member, mutual friends and friends of friends the member have in common with his/her potential matches. The system can present a plurality of images, each viewable by swiping through the images of potential matches, adding more context and an extra degree of connection to every swipe.

The method includes receiving a requesting member to request a date with a requested member with a meeting date, place, and time; and if the requested member accepts the date request from said requesting member, generating an on-demand ride-sharing request for both members to share a ride-sharing vehicle with a mobile device.

For security, the system can check out the social connections of the members and determine unusual or signs of social disconnect and provide such information to the other member. For example, if one of the members have been writing anti-social messages, the other member would get these messages to make a decision. Also, if the member claims a particular social status but his or her financials do not support such status, the system would flag this. The financials can be estimated as detailed below, and additionally the drivers can provide evaluations of the rider/member and such information can be presented to the other member either for free or for a fee.

When users register to become members of online dating communities, they are prompted to enter detailed personal information. The relevant information that will be needed for the 'set up a date' methodology is their real name and user name to reduce the likelihood that a member would contact another member for a date with fraudulent or inappropriate intentions. Once a member has registered, they can browse the online dating application to view other members. These members will be labeled under their usernames. When the user finds a member he/she is interested in, he/she may contact the member. Once the two members communicate, one member may choose to request a date. While the members may do so in a traditional manner via telephone call or email, the 'set up a date' process herein described offers a safe alternative that will allow members to request and accept dates while maintaining a sense of security regarding their personal safety. When a member wishes to set up a date with another member, he/she will click on the "request a date" button on that member's page. The requesting member will then be prompted to enter the information including their username, their real name, a meeting time and a meeting place. The username and real name must match with the information entered during the registration. This will prevent a person from requesting a date under another member's username or real name.

When a member makes a date request, a record will be kept showing when the request was made, to whom it was made, when it was made, the details of the request, and whether the date was accepted or denied. When a member receives a date request, the dating history record will be updated to show who the request was from, the details of the request, and whether the request was accepted or declined. All of the above referenced information will be automatically input in to the dating history record when requests are made, accepted, or declined. As such, members will not be able to edit their own dating history record. Members will also not be able to view the dating history records of other members. To provide another level of security and further ensure that members have peace of mind when using the set up a date methodology, members may choose to have an emergency contact designated. This emergency contact may or may not be the local authorities. Members may also choose to designate a close friend, relative, employer, or neighbor. Members who have chosen to designate an emergency contact will be required to update their dating history after the member has gone out on a date to show that the member has returned home from the date safely. This will then be reflected in their dating history record. After a set number of days after a date, if the member has not updated their dating history, his/her emergency contact will be notified. This notification may be made by an automated message or by a phone call from an administrator. If the member has safely returned, he/she can change the dating history after being contacted by their emergency contact. Under the unfortunate circumstance that the member has not returned, the emergency contact will be able to take the necessary steps in the best interest of the member. The process of having an emergency contact will give members a sense of safety as they use the set up date methodology.

Due to the social network, daters are motivated to behave and additionally, the other dating member can check on the social connections and ratings of the borrower. Due the network, daters would not want to be embarrassed by their friends if too many dates complain on their page, so the mechanism keeps abusers in check in the same way that credit rating and lending are described below.

Item Lending

In another scenario, instead of delivering purchased items, the system can deliver items loaned by user. For example, the user may have items to lend and may also wish to borrow non-monetary items. A loan-matching infrastructure is provided to identify another user with complementary lendable items and borrowing desires. The item lending can be done based on the credit history of the user, as detailed below. Once the borrower has been vetted, the ride-sharing service can pick up and deliver the loaned items. The item lending matching may introduce users that are in the same social network but not yet connected to one another in that social network, or it may serve to strengthen the relationship between users who are already connected.

As a further scenario, the architecture may enable a user with a lendable item to broadcast and/or narrowcast the availability of the item to just friends or to many other users. One of multiple users that respond to the broadcast/narrowcast may be selected based on speed of response, lending metric, social network relationship, and the like. For items that are able to be lent only a limited number of times, this technique of soliciting many responses may assist the user in deciding which user or users are allowed to borrow the item.

The lender can check on the social connections and ratings of the borrower. Due the network, borrowers would not want to be embarrassed by their friends if the lender complains, so the mechanism keeps thieves in check in the same way that credit rating and lending are described below.

Group Purchase/Delivery with Ride-Sharing

In one embodiment, individual riders can dynamically form buying blocs and thereby avail themselves of various benefits or incentives for purchasing as a group that would not be available for the individual alone. In one illustrated example, the system contacts a first rider who interested in going to a particular place or event. The first rider then forwards the destination to one or more additional riders. A relationship is maintained between the riders in that members of the group benefit from the purchases of other riders and avail themselves of the greater buying group reward.

The system can be used to bring riders to local events such as meet-up groups, for example. For example, Bob can form a group to promote start-up entrepreneurs in San Francisco. He can send emails to his group members indicating a time to meet and a reduced fee ride-sharing service fees if a sufficient number of group members are going to that particular meet-up. The reduced fees can be the result of the volume of ride-sharing riders, and can also be from the efficiency of carpooling and picking up members who are close to each other in a few vehicles.

By way of example, Bob is a frequent purchaser of sandwiches at a local eatery. Bob knows that he can either order his dinner on-line by himself, or he can order his food in a bloc and take advantage of incentives that the restaurant might be willing to offer for group purchases. In order to find others interested in buying food from the restaurant or other restaurants from the same complex, Bob could log on to a web site, social network similar, e.g., to facebook.com, and invite others to join him in purchasing food from the restaurant. Alternately, he could enable a signal on his desktop that would search out and alert other possible participants about the purchase. In this scenario, Bob logs on and conveys his interest in buying a sandwich to others, and discovers that Jim and Cheryl are also interested in buying a cake from the same restaurant. If they all agree to purchase from the restaurant, e.g., then they can place their orders with restaurant as a group. Of course, the restaurant would have to have provided some incentive for purchasing as a group. This incentive could be in the form of a reduced price on the purchase, a reduced price on a future purchase, coupons, additional products/services, or even a point system in which the purchaser acquires points that can be used on goods and services. Any form of incentive could be utilized, and the provision of incentives is primarily an accounting issue.

The group purchase would not have to be implemented as a simultaneous purchase. The "group" purchase could be performed within some defined time period. For example, for sandwich purchases, the purchases could be considered as a "group" purchase if made within three hours of each other, whereas for electronic purchases, the "group" purchases could be performed within a week, and automobile purchases could be performed within two months. Some mechanism would have to be used for identifying purchasers as belonging to a particular buying group. This could be implemented by assigning each group a unique identifier that is used in common by each member of the group when making the purchase. It could also be accomplished by the signaling mechanism, where authorization to make the purchase is delegated to the signal mechanism by each group member or member group (a participant can be an individual or a pre-defined group of individuals) and an authorized "bloc manager" can authorize purchases to be made by group members to take advantage of an opportunity. This can be accomplished electronically by the signal mechanisms on each participant's desktop.

In the above scenario and according to one embodiment, Bob, Jim, and Cheryl have all agreed to purchase from the restaurant and are therefore all given a group identifier to use when making their purchases. They are all aware of the need to purchase a pizza within some arbitrary time limit, e.g., three hours, in order to take advantage of the group incentives offered by the restaurant.

This concept could be further extended in that Bob, as the initiator of the buying group, could be provided additional incentive. In this scenario, Bob could get $1.00 off of his next ride as the group initiator, whereas the other members in the next level downstream in the hierarchy get $0.75 off of theirs. Thus, Bob initiates the formation of the group and receives a higher incentive. However, Cheryl then further gets her friends Sally and Bill to join the group, giving her an additional incentive as well. This hierarchical structure form of incentives that cascade down into various tiers could serve as the basis for aggregating large blocs of purchasers based on collective incentives for all of the group members to get others to join. This organization would also encourage a person to be the first to form a buying bloc, since the incentives are greatest for those who join early on, thereby rewarding the frequency and immediacy of a call to action for a sale. However, there is still a substantial incentive for the late-joiners, given that the larger numbers infer greater rewards. The concept could be implemented for contacts between friends (e.g., X e-mails a friend inviting him to join X in a trip), but could also be implemented anonymously. For example, the web site could have a lounge area that people make themselves available in. These people could preregister certain interests, either specifically, such as pizza, DVD players, etc., or generally, such as food, electronics, etc. Thus, based on the preregistered interests, these individuals can be specifically targeted by those interested.

The method may further include placing in the item group at least one of a good (e.g., a food product, a perishable, a consumable, a household item, a commodity, a beverage, a fruit, a bread, a meat, a paper product, a tool, a medicine, a plastic product, a health related product, etc.) and a service (e.g., car-wash services, cleaning services, food services, and/or other residential services), and generating a frequency data indicating a periodicity at which each item in the item group is demanded by the registered user.

The system may include geo-fencing (e.g., a street, a neighborhood, a city, and a county) the item group in an area that encompasses a neighborhood community in a threshold geographical radius from the registered user who creates the item group. Also, the method may include listing the item group as one of a set of buying groups separately represented from a set of social groups in a geo-spatial social network embodying the set of buying groups and the set of social groups. The method may further include creating a bidding system among the set of providers of the items of the item group in which the set of providers have a time constrained auction system to provide commitments of price, schedule, and/or delivery of items of the item groups to the registered user and/or the at least one of the neighboring users geo-spatially proximate to the registered user.

In addition, the system may include providing a voting interface to members of the item group such that the winning provider may be determined based on a voted one or more of the set of providers. The method may further include automatically providing a fulfillment and tracking engine to members of the item group and to the winning provider, such that the parties see a delivery status of items of the item group through the geo-spatial network. Additionally, the fulfillment may be provided to at least one of a central depot in a neighborhood location convenient to members of the item group and/or to individual residences of members of the item group Vendors can place a bid of providing goods and/or services to a neighborhood buying consortia of a geo-spatial social network, debiting accounts of the members of the neighborhood buying consortia based on a contract formed when the bid forms the contract with members of the neighborhood buying consortia, and automatically generating a route to deliver the goods and/or services to members of the neighborhood buying consortia.

The ride-sharing system can provide delivery services between a set of providers and a set of members of the shopping group, and an advertising module to pre-qualify the shopping group to the set of providers based on at least one of an income, a frequency, a cost, and a location of the members of the shopping group.

Customizable Taxi or Ride-Sharing Environment

The vehicle can be customized for the rider's enjoyment. For example, the color can be adjusted using flexible displays. Systems and methods of this disclosure allow a user to set or change the outer appearance of an interior of a vehicle such as a car, a taxi, or electronically customizable article (e.g., a handbag). In one aspect, a method to customize a ride includes receiving a ride-sharing request from a rider and picking up the rider in a ride-sharing vehicle; retrieving a social network profile from the rider; identifying one or more interests from the rider; and customizing the ride-sharing vehicle to match the rider's one or more interests.

Implementations of the electronically customizable articles can include an electronic visual display such as a flat panel display to display a user-selected or created color, design, pattern, image, slideshow, video, or other electronic visual display on the exterior of the article. The customization can be based on preferences set in the rider's mobile device or stored on a cloud such as Facebook, Box, Gmail, or OneDrive, among others.

In some implementations, the electronic visual display can be a flexible digital display canvas. In some implementations, the electronic visual display can be a touch screen. In one embodiment, the entire rear passenger area of the ride-sharing vehicle can be customized to the rider's preference. The side doors can incorporate flexible displays thereon, and the back of the seat in front of the rider can also have flexible display or screen to receive projections thereon. Mover, the windows of the vehicle can have flexible displays that can be rolled down to block sunlight and to adjust the color and ambience of the cab cabin. In some implementations, the hardware and software for the graphical user interface are configured to permit the user to manipulate images through, for example, color, color depth, brightening and contrast adjustments, special effects, multiple image merging, softening options, sharpening abilities, image enhancing, image rotating, selective color changing, options of adding and removing elements, cropping, size and orientation adjustments (e.g. landscape or portrait format) and image layering. The electronic visual display on the electronically customizable article may be user-created, downloaded from a remote server, transferred from a local computing device or portable storage media, ordered, or a pre-existing image stored locally (e.g., in the electronically customizable articles) or remotely, for example.

In some implementations, the user-selected or created display can include a color, a design, an image, a pattern, a slideshow, a video, media content, or any other electronic visual display. In some implementations, the user-selected or created display can include a specific color such as a PMS, Hex, CMYK, or RGB color, or any other color. In some implementations, the user-selected or created display can include one or images such as a jpeg, bmp, eps, psd, gif, pdf, raw, and/or tiff image. In some implementations, the user can select the view (e.g., landscape or portrait) for a display. In some implementations a time and/or date, email, or text message notification can be displayed on the electronic visual display. Display options also may consist of a user selected real time news feed, a social media feed, or other informative feeds such as stock market data. In some implementations, the electronically customizable article can display a media/video clip.

In some implementations, the electronically customizable article can display video during real-time or near real-time video capture based on the videos/presentations that the rider has previously watched and paused prior to getting into the vehicle. In some implementations, the electronically customizable article can display live video images, still images, and video playback. In some implementations, the electronically customizable article can include a built in camera to capture and/or record the video or still images. In some implementations, the video or still images can be transferred to the electronically customizable article. In some implementations, the electronically customizable article can include video-teleconferencing abilities including Skype, FaceTime and video chat capabilities so that the rider can resume his/her conferencing. In some implementations, the electronically customizable article can support and download various game systems e.g. Java games. In some implementation, the electronically customizable article can include pre-downloaded games. In some implementations, the displays in the cabin can be configured to connect with a mobile device via Bluetooth connectivity, for example, to display visual notification of incoming calls, text messages, calendar dates, email messages or voicemail messages. In some implementations, through the use of computer or mobile applications or other wireless communication operating system, selected retail information can be relayed to the electronically customizable article in visual and or audible notifications of information such sales, coupons and rebates dependent on the location of the device in the vicinity of the retail store with GPS use. In some implementations, the cabin displays can be used for advertisement purposes. In other embodiments, the ads can be used to pull in groups to increase their buying power to reduce per person cost when buying in bulk, and the vehicle can deliver the product or the rider to the store to pick up, among others.

In some implementations, the electronically customizable article includes E-Reader capabilities for E-Books, magazines, newspapers and other reading articles on a possible fee basis. Text and images can be displayed in formats such as, but not limited to or required to include PDF, TXT, CHM, DOC, EXEL, EPUB, RTEF, and PUB. In some implementations, the electronically customizable article can be configured to adjust the text size. In some implementations, the electronically customizable article can be configured to vocalize the text via an audio narrator feature.

In some implementations, the electronically customizable article may be configured to play and display various music systems e.g., mp3 player or media player. In some implementations, the electronically customizable article may include incorporate sound sensors that can activate visual simulation of displayed images or colors with sound e.g., displayed color changes with received sound frequencies. In some implementations, the electronically customizable article may serve as an alert system for incoming calls, text messages, emails, calendar events, alarm clock alerts, traffic alerts, car and home alarm system alerts and other alerts.

FIG. 3 is an interior side view of two left side doors 18 and 20 of a vehicle having a rear door window 14 and a front door window 16 in the preferred embodiment of the present invention. Each door has a handle 22 and 24. Positioned above the door frame of each door is a customizable flexible display 10 or 12, each of which can change color or image as desired and can also act as window shade or privacy screen. The window flexible displays are retractable rolled sheets of material for use in blocking the sun from the interior of the vehicle. The display can be flexible organic light emitting diode (FOLED) which is a type of organic light-emitting diode (OLED) incorporating a flexible plastic substrate on which the electroluminescent organic semiconductor is deposited. This enables the device to be bent or rolled while still operating.

As illustrated in the embodiment of FIG. 3, the window shades are retracted to the rolled (retracted/up) position. The window shades are positioned to be clear of the opening of the doors. The window shades are preferably constructed of a non-transparent flexible material preventing the penetration of sunlight through an extended shade. In an alternate embodiment of the present invention, the window shade may be constructed of a transparent tinted material. However, any flexible material may be utilized, such as fabric, plastic, or any synthetic material. In the preferred embodiment of the present invention, the window shades are similar to retractable window shades utilized in a home, where the shades are pulled downwardly to an extended position to cover the windows. In the retracted position, the shade is rolled back to the up position. On each side of each window shade and extending horizontally downwardly the full length of the extended window shade may be optionally located wires 26, 28, and 30. The wires guide the shade to the down position. In alternate embodiments of the present invention, any number of wires or other guidance devices may be utilized which provides guidance for extending the window shades. The window display panels are pulled downwardly to the bottom of each vehicle window 14 and 16. Preferably, the window displays are connected to each other on common sides by connectors 19. The connectors may be constructed of any material, such as wire or fabric. The connectors may also be positioned in any manner to allow the wires to guide the window displays to and from the retracted and extended positions. Therefore, when one window display is pulled downwardly, the other window shade is also forced downwardly. In an alternate embodiment of the present invention, the window shade may be pulled down by a motor 60 which moves the wire 28 down when actuated. In such an embodiment, a bottom portion of each window display may be attached to one of the wires (i.e., wire 28). The motor may drive the wire upwardly or downwardly, thus driving the window displays to the extended or retracted position. When the motor is utilized, the wire 28 is preferably affixed to a pulley system to allow the wire to move along a vertical axis. A motorized pulley system is well known to those skilled in the art of mechanized devices. In addition, the motor may be actuated via a remote control unit, preferably associated with remote keying systems well known in vehicle entry devices.

Security Checking

The danger of a ride-sharing or taxi driver is a turnoff for drivers, in particular women drivers. Taxi drivers are more likely to be assaulted or robbed than other types of workers. The Occupational Safety and Health Administration says that taxi drivers are 20 times more likely to be murdered on the job than other workers. Thus, security is important. Security is provided by a camera and additionally by a social reputation module of the rider or the driver. The system uses a social reputation module to determine if the rider or driver has a problematic social history. The system also checks if the rider has poor finances that can lead to non-payment. This can be checked in part through a credit history. One embodiment uses a money graph derived from the rider's social network to determine whether the rider can pose a danger to the driver (and vice versa). Another embodiment uses the social network information and the driver's collective evaluation of the rider and the location he/she travels to as a basis for determining a credit history. This is a very cost effective way of rating a person's financial worthiness, particularly for developing economies that do not have a ready credit history database. In effect, the drivers provide boots-on-the-ground evaluation of the credit-worthiness of the riders because the drivers can see with their own eyes the actual conditions that the riders live in.

The sources of information required to compute social reputation may include major social and professional networks, social bookmarking sites, blogs, location based social networks and may include other sources of information when deemed relevant. The information collected from the different data sources can include the user or member's biographic information, behavioral Information, the nature of his/her connections, their network activity, professional background, area(s) of expertise in addition to other contents and achievements information on social networks. All this information is then processed to compute the social reputation. The social reputation module relies on the following three main scoring criteria related to the demographic, behavioral, Psychographic traits of the user or member to come up with a score called Social reputation:

1—Authenticity: which is assessed based on biographic, and behavioral information about the user. This criterion is used by the system to measure the user's or member's credibility with regard to his/her biographical data and social network activities referred to as behavioral authenticity.

2—Connections: this criterion looks at both passive and active aspects of users' connections. It expresses the nature of the user's or member's connections in major social networks: Facebook, Twitter, LinkedIn and Orkut to differentiate between users or members with stagnating, passive, connections and active socially engaged users or members. The system uses this differentiation to detect people with good social reputation.

3—Expertise (knowledge): users are evaluated as consumers, and/or as professional. The Social reputation application gives credit to users or members depending on their level of expertise and how they use it. This criterion differentiates between the skills that users or members may master thanks to their academic or professional background and the ones that they have acquired by using different social networks such as Facebook and Twitter.

The social reputation of a user or a member is calculated using a nonlinear combination of the three sub criteria scores defined by the social reputation scoring system. The sub criteria (authenticity, connections, expertise) scores are obtained using different nonlinear combinations of the coefficient factors of data falling under each category.

To determine social reputation, information such as name is collected from a specific source, usually one of the major social networks: Facebook, Twitter, LinkedIn or Orkut but could also come from others such as Jaiku, MySpace and so on. In this case, name is assigned a coefficient factor that is used along with other coefficient factors (location, address, gender . . . ) to compute the biographical score (E) of the user or member. The same method is applied to get the behavioral authenticity score (F) for data under this category: academic background, connections, endorsements and so on. (E) and (F) are then used by the system to obtain the authenticity score of the user or member (A). Following the same technique, the system works out the user's or member's connections' score (C) and Expertise score (E). Finally, (A), (C) and (E) are involved in the final social reputation score of the user or member. For example, the user's or member's academic background is verified through his/her LinkedIn account and is used in both biographical authenticity and field expertise.

The high level equation to compute the social reputation includes four sub scores and several coefficients all based on the information described above and are explained below:

The Base Score quantifies basic information about the user or member;

The Activity Score reflects a weighted average of the level of the user's or member's activity in major social networks such as Facebook, Myspace and Orkut and is also based on their twitter activity.

The Credit Score is weighted by the following coefficients:

Account verification coefficient (AVC) which reflect how credible is the user's or member's basic information through verification via at least one of his social network accounts Wealth Qualification Coefficient (WQC) reflects user or member wealth Job Coefficient (JC) reflects type of work and length of employment. If the user is an executive or in a high paying position the JC is higher. JC also increases with steady employment duration.

The Other Basics Score quantifies basic information other than the one taken into account in the base score, such as relationship status The user's or member's Social reputation grows over time (by paying on time, growing his/her connections across the social web, number of invitations he made to the RCA site, tweeting or posting his Social reputation . .

. ). As the score increases the user or member gets access each time to higher levels of influence on the Social reputation score. Social reputation may also decrease overtime if the user's or member's activity on social networks decreases over time.

The structure of the Social reputation measurement system presented herein is modular in nature and is prone to including new modules to account for other emerging components of the social media landscape that may become relevant to assessing individual's Social reputation.

Credit Rating

In one embodiment, each ride sharing driver rates the passenger based on a personal discussion of the passenger and the start/destination of the rider and supplement the credit rating information with an in person review of the rider's dress style, communication skills. The system also compares the virtual networking rating or social reputation of the rider against reality. The result is an enhanced near real time assessment of the rider's credit-worthiness based on his/her social connection and social reputation scores. In another embodiment, the data may be extracted from the database to be transformed, aggregated, and combined into standardized records for each rider. The step of transforming the data may include custom transformations to mine for further data. The data in the file records may be used as input to descriptive and predictive models to determine how likely borrowers are to repay debt. The models may also be used to predict a likelihood of fraud or other behaviors. In a preferred embodiment, the models may be used to affect credit scores of other individuals in a user's online social network.

Payment behavior is modeled on social reputation data and personal information to predict repayment of loans. Prior lending repayment performance is also used for additional predictive power. Using a credit model that is built from developed datasets, determination of credit worthiness can then be performed by using a cluster analysis algorithm to identify evidence in the data to measure social status and reputation. The algorithm used is driven by a lending transaction objective. This in turn permits the distance metrics that are used in the cluster analysis to be calibrated in the context of the stated lending transaction objective. In other words, the invention generates clusters that are more closely aligned with the borrower's case and is therefore a semi-supervised segmentation as opposed to a completely unsupervised segmentation.

The predictive credit model approach described above regarding social status, reputation, endorsements and personal data may be applied to other characteristics that may influence credit worthiness, for example, friendship, affiliates, attitude, habits, purchasing trends, travel patterns, long term goals, extracurricular involvement, and stability. Affiliates may include neighbors, classmates, educators, colleagues, and employers. Attitude may reflect specific endorsements or even a more general holistic view of the borrower held by friends, family and affiliates. Purchasing trends may be a repeat expenses resulting from day-to-day habitual activities. Travel patterns may vary from day-to-day habitual activities such as a daily commute for school or work to extended trips for personal reasons. Long term goals may be an ambition toward a future accomplishment or acquisition. For example, buying more land to expand a farm may be a long term goal. Another long term goal could be completing a higher level of education or vocational training program. Extracurricular activities may be more broadly reflective of hobbies or obligations and can be readily affected by lifestyle and life-stage factors.

Stability of an individual can be reflected in the duration of time in which said individual has lived in a specific location. If a borrower has indicated that he has lived with his parents his entire life and his parents have lived in the same house for 30 years, that indicates more stability than if the parents have been moving to eight different towns in the past five years. Even though there is a perceived stability with having lived with his parents his entire life, the high frequency of moving relative to a short period of time indicates less stability. Stability, or lack thereof, can also be reflected in the pace at which the borrower's lifestyle changes. If the borrower changes friends and/or extracurricular activities frequently, there is a higher correlation to instability than a borrower who has a routine and steady social pattern with friends.

The stored queries are enabled using capabilities of a database management system and a structured query language. A file of the borrower data needed for borrower analytics is created for each new lending request. The borrower data may be extracted by running one or more queries against the stored queries in the database.

The model may dynamically calculate additional variables using predetermined transformations, including custom transformations of an underlying behavior. If additional variables are created, the model may be modified to include the additional variables. The model is often a dynamic view of the customer record that changes whenever any update is made to the database. The definition of the model provides documentation of each data element available for use in models and analytics. It should be appreciated that the architecture by which the predictive model imputes with considers that: age drives obligations; extracurricular activities drives purchasing trends and travel patterns; attitudes toward the borrower by their friends, family and affiliates impacts social standing; habits affect long term goals; life-stage and lifestyle affect travel patterns; education affects long term goals; long term goals affects purchasing trends; social standing reflect life-stage and lifestyle; and so forth.

After aggregated data is gathered from the online social footprint for the identified individuals to one record per individual, ratios based on derived variables are created. The "promising" (those who pay) correspond to individuals who have negligible debt, positive social standing reflected about them in their online social footprint and no conflicts or negative events in their online social footprint. The "troubled" (those who do not pay within a predetermined time duration (performance window)) correspond to individuals who are the opposite. They have measurable debt, questionable social standing reflected about them in their online social footprint and some conflicts or negative events in their online social footprint. Credit attributes are appended to each borrower record.

Preliminary data analysis for basic checks and data validity may be performed. The predictive credit model can test and verify both the personal information provided by the user as well as the results from the modeling performed using extracted data gathered from the online social footprint. In contrast to a typical static credit model where the models and the data variables are held constant, the credit model of the present invention may be dynamically retrained prior to use in order to capture the latest information available. The information the borrower provides about himself is corroborated so that latest and correct information is associated with the borrower. For instance, as part of the traditional loan approval process personal data such as education can be verified with the institutions the borrower attended for school as indicated by the borrower. Similarly, a phone number can be verified in a telephone directory. However, by using the social graph the information a borrower provides about himself can be corroborated by probability. If the borrower indicates that he works at the Petron Corporation, then there is a high probability that others who work at the Petron Corporation are in his social graph. If there is no one in his social graph that works at the Petron Corporation, then the credit scoring process would flag his profile for a more intensive review and scrutiny at the expense of receiving a strong credit worthiness score. In an alternate example, if the borrower has indicated he is a physician however he writes at a level of a person who is nearly illiterate as evidenced by his text in his social footprint, then his profile would similarly be flagged as suspicious and undergo further scrutiny. By way of a geospacial example, if the borrower states he is a resident of Oaxaco, Mexico for his entire life, however none of his family, friends, colleagues are in Oaxaco, Mexico and the Tijuana, Mexico is frequently referenced in his social footprint, then his profile would be flagged as suspicious with unverifiable personal data.

With another embodiment of the invention, a credit model using data gathered from the online social footprint can identify and rank all future debts on a likelihood of payment during collections process in conjunction to the credit scores. Credit scores generated by the credit model will be used to rank credit worthiness. For instance, a higher score implies that creditor is more likely to pay compared to creditor with a lower score. On the basis of credit scores, differentiated lending treatments can be designed and optimized over time for each risk score cluster of the credit model.

In another embodiment, treatment actions based on the determined treatment type can also be determined as a function of the credit model.

With an embodiment of the invention, predictive modeling is performed using more than 1,000 variables gathered from the online social footprint, to include machine footprint variables such as browser settings, and network fingerprints such as IP address or connection type, credit variables and identified attributes that are predictive in explaining payment behavior. Automated final model equations (scoring expressions) are generated that are used to score individuals who have outstanding debts to find individuals who are most likely to pay owed amounts. With an embodiment of the invention, a scoring expression is a statistical regression equation determined by the statistical tool. The regression equation typically includes only the relevant variables from more than 1,000 mined variables, it is therefore possible that an embodiment only uses one or two key variables.

In another embodiment of the invention, a process for configuring a plurality of score clusters in a credit model. In the process, data gathered from the online social footprint data as previously discussed is analyzed to configure a plurality of score clusters or segments in accordance with desired statistical characteristics. The tree based algorithm finds the top variable which divides the borrowers into segments with similar percentage of "promising" and "troubled." These segments can be defined by risk acceptance criteria. A risk acceptance criterion, for example, can be a debt to income ratio at a specified level. An individual with a greater amount of debt than the amount of income has a debt to income ratio greater than 1.0. A minimum risk acceptance criterion would be a debt to income ratio of less than 1.0. In a preferred embodiment, a risk acceptance criteria for the techniques described herein is the user presenting activity on at least one social network. Put simply, a user must have a social footprint on the social graph.

How the user scores according to the risk acceptance criteria can then be supplied to the algorithm to determine the credit worthiness. The algorithm can incorporate weighting factors that give more importance or less importance to various risk acceptance criteria. The creation and implementation of the algorithm is commonly understood by one of ordinary skill.

Figure 6A:
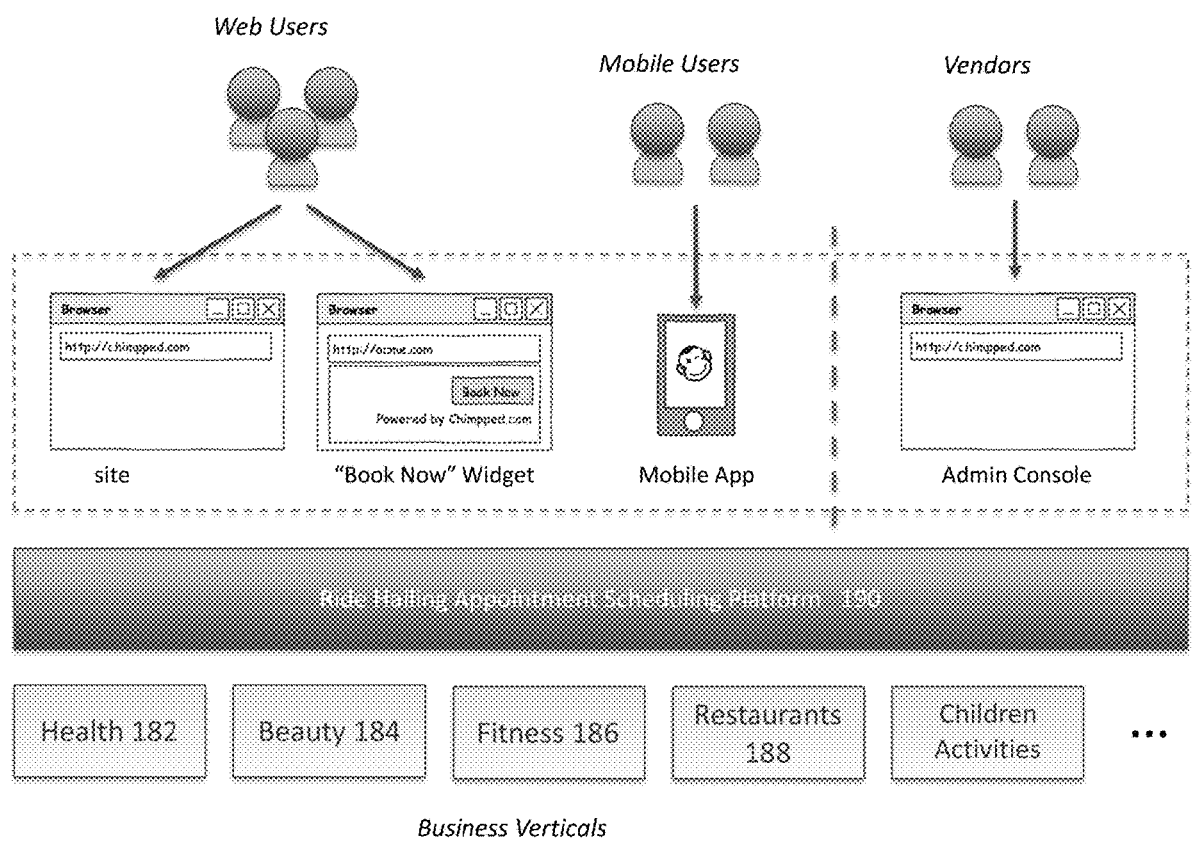
FIGS. 6A-6B show an exemplary architecture for the on-demand ride-sharing scheduling platform to deliver customers for businesses.
Figure 6B:
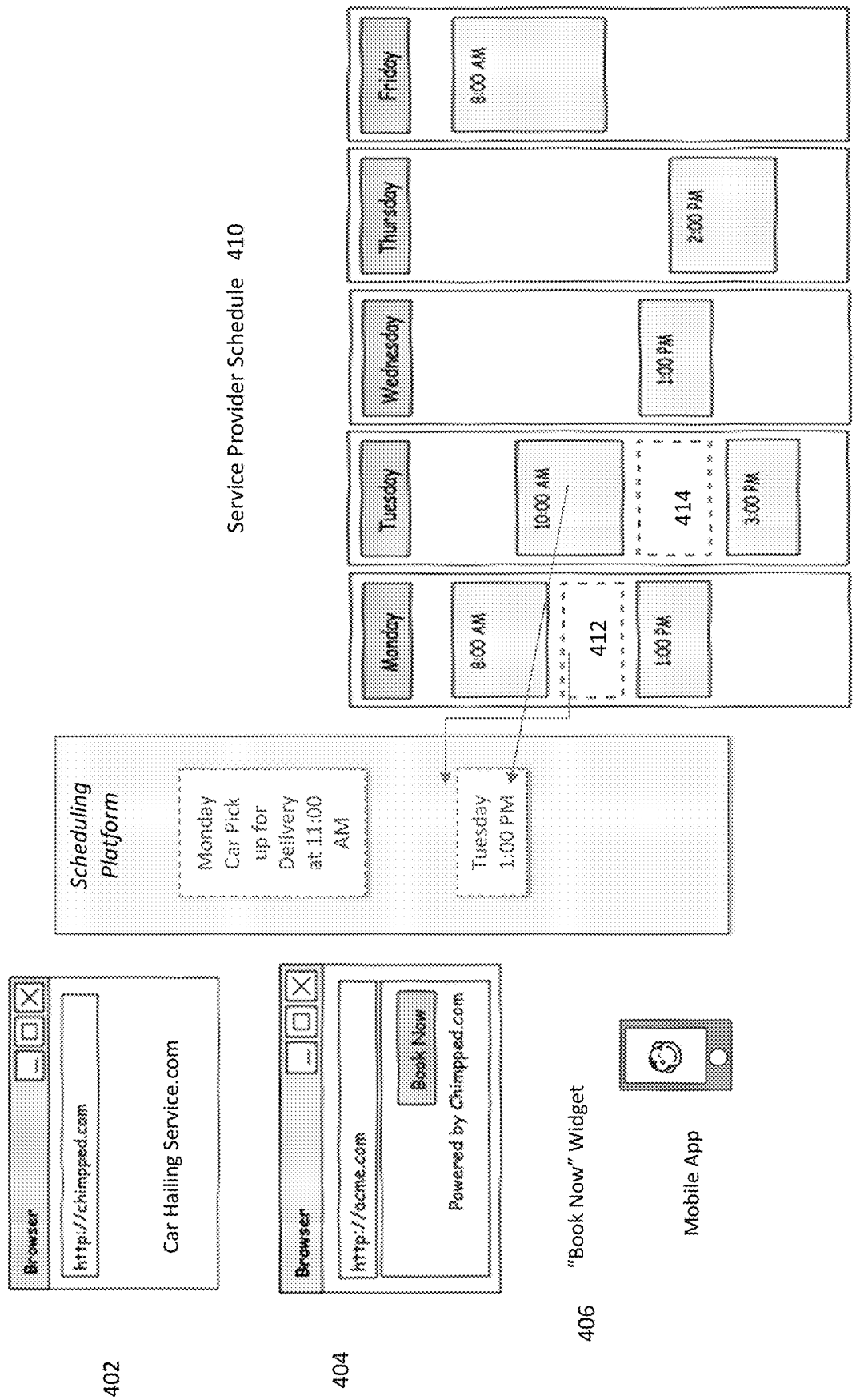

FIGS. 6A-6B show an exemplary architecture for the on-demand ride-sharing scheduling platform 190 to deliver customers for businesses. The platform 190 provides a one-stop scheduling system for end-users to make appointments and connect with service providers of multiple industries who sign up with the system to be automatically picked up by ride-sharing drivers and delivered on time to the appointment. The scheduling platform 190 serves a variety of business verticals such as health vertical 182, beauty vertical 184, fitness vertical 186, food vertical 188, children activity vertical 190, restaurants, clubs and bars, among others. For these verticals, the system provides a web-based and mobile scheduling software for connecting multiple industries' scheduling onto one platform. Industries include:

1. Health—Doctors, Dentists, Vetenarians, Hospitals, Other Specialists
2. Beauty—Spa, Nail Salon, Hair Salon
3. Fitness—Gyms, Specialized fitness centers, Sport classes, freelance fitness/sport coaches
4. Children's activity centers—Academic, Child Development, Sport, Art, Music, Dance
5. Restaurants
6. Others—Professional services, freelance/self-employed consultants, among others.

The system minimizes the hassle of booking appointments through an array of channels with no consistencies or simplicity: phone, online, booking sites, individual company websites. Back and forth email chains between friends on suggestion, deciding and booking group events and activities are minimized. The system reduces error arising when the user forgets to put the scheduled appointment onto calendar (iPhone, Outlook, Google). The system reduces the time and effort required to find a service provider with walk-in availability given an impromptu desire. Additionally, the inefficiency of manual scheduling of appointments and staff availability is avoided.

A user can sign-up with the system easily and free of charge or download through an app directly on iPhone or Android-operated phones. For convenience, the system allows the use of Facebook sign-in information. Once the user is signed-in, the user can search for a specific company or by certain criteria (type of service, closest date of availability, etc), and schedule the appointment. The appointment will also integrate with the user's choice of major calendar tool such as iPhone's calendar, Outlook, Google Calendar. For any alteration or cancellation of appointments booked through the system, a URL allows the user to be directed to the platform to do so. Reminders are sent to the user based on his choice of contact channel, and provide an opportunity to cancel the booking instead of "no-show" at last minute.

Business vendors who sign up for the system's scheduling services are empowered to use many functionalities that improve customer experiences, employee and customer scheduling efficiencies, and increase revenue by maximizing capacity utilization and engaging customers.

The business vendor inputs its operating hours, maximum capacity for each hour (depending on industry, maximum capacity may be further itemized by employee or by table, etc), duration for each type of services. It is anticipated that these inputs are only required to be updated once in a while. The system allows the company administrator to manually input a customer booking in the event the customer phones or walk in person. As such, once the master schedule inputs are completed, the company is able to view its appointment book on a real-time updated basis. There are fewer occurrences of writing down the wrong time, name or phone number of customers.

Business vendors also have the choice of putting a "book now" button (powered by the instant platform) on their company websites. Once a customer presses on the "book now" button, he is able to schedule an appointment with that business vendor on an interface powered by the instant. Even if the business vendor chooses not to have its business listed on the platform visible to all users, the business vendor's customers can still schedule appointment with this vendor by pressing on the "book now" button.

For businesses who want more control over appointments, they can opt to have the ability to reject or decline an appointment. After opting for such flexibility and if business vendor does not respond to the appointment request in time (specified by the business vendor), the appointment will be deemed as accepted.

The system provides customized services which are locally optimized to suit an individual user's requirements and yet which globally optimize the utilization of the system resources supporting such customized services for each individual seeking customized services. With the system, users will get the simplicity and convenience of scheduling appointments within one platform instead of having to go into multiple websites or applications. Once appointments are made, users will also easily integrate the appointment details within the users' existing calendar tools (such as iCal). In addition to scheduling appointment for an individual user's own purpose, the platform also allows users to coordinate events with their friends and make the appointment directly on the system (after the venue, date and time are voted on and chosen on the system).

The system provides a holistic scheduling platform that allows businesses from all industries to sign-up and customers 120 or 130 can schedule appointments with these businesses or vendors 140 through the system's website 122 as detailed below. Mobile users 130 can access the system though a mobile application 134 such as an Android or iPhone application. The mobile app provides a better user experience than mobile websites are capable of.

Users can also access the system through a vendor website through a "Book Now" widget 132. The "Book Now" widget is a button displayed on the vendor's web site for a user creates an appointment using the system. When the user clicks the "Book Now" button on the vendor's site, an appointment can be created with a link back to the vendor's website. One embodiment uses the Open Graph protocol to specify information about the vendor entity. When the vendor includes Open Graph tags on its Web page, the page becomes equivalent to a system's page. This means when a user clicks the "Book Now" button on the vendor's page, a connection is made between the vendor's page and the user. The vendor page will appear in the "Likes and Interests" section of the user's profile, and the vendor has the ability to publish updates to the user. The vendor page will show up in same places that the system's pages show up around the site (e.g. search), and you can target ads to people who like your content. There are two "Book Now" button implementations: XFBML and Iframe. The XFBML (also available in HTML5-compliant markup) version is more versatile, but requires use of the JavaScript SDK. The XFBML dynamically re-sizes its height according to whether there are profile pictures to display, gives the vendor the ability (through the Javascript library) to listen for like events so that you know in real time when a user clicks the "Book Now" button, and it always gives the user the ability to add an optional comment to the book now function. If users do add a comment, the story published back to the vendor is given more prominence.

Vendors 140 can access the system through an administrative console. In these verticals, for the business vendors who sign-up with the platform 100, they have the flexibility and choice to do the following:

1. Input all or some of the business' operating hours and schedule availability, so that users can automatically schedule appointment anytime, anywhere.
2. Opt for ability to decline or reject appointments.
3. Opt for the business not to be displayed on the list of business vendors, while that business' customers can still schedule online appointments automatically through a "book button" that is supplied by the system for display on the business' website.

The system performs aggregation of different variables and inputs for different industries in order to solve for the same thing: schedule availability. Whilst to the user, the platform gives them the same convenience of finding the schedule availability so they can book any vendors.

Next, exemplary operations within three industries: (a) health & beauty, (b) kids activities and (c) restaurants industries, are discussed. For health & beauty, the key variable inputs that solve for schedule availability or the vendor in this industry aggregates the vendor's staff's own individual schedule and service duration. The ratio of staff to customer is generally 1:1. Assume a vendor in this industry has 3 staffs who perform services. For timeslot 9-10 am, Staff A has been booked but Staff B and Staff C have not been booked. Then there exists 2 remaining available booking slots for 9 am. For restaurants, the key variable inputs that solve for schedule availability is defined by table. The vendor names each table and defines it by seating capacity and maximum time limit allowed for that table per each booking. For children activities, the key variable inputs that solve for schedule availability consists of seat capacity per course, duration of course, frequency of course (per a multitude level of units such as daily, weekly, biweekly, month and also for each of these, a subset of occurrence frequency exists such as occurring 2 days per week or 1 day per week, for example).

In one embodiment, the specific variables and inputs for exemplary industry-flows in calculating total availability (by date or by staff or by earliest availability). The system will deduct the online bookings made by users and manual bookings input by vendors to constantly arrive at "remaining schedule availability" real-time.

1. Health & Beauty Variables and Inputs
    Total number of staff (service providers)
    Each staff's availability on each day and time
    Each staff's list of services provided (i.e. each staff is tagged with all the services she/he can provide)
    Define and listing of each service
    Duration of each service
2. Restaurants Variables and Inputs
    Name each table and its seating capacity
    Maximum time capacity allowed for each table's booking Define each shift (breakfast, brunch, etc) duration and the tables allotted for each shift Block any tables as desired by vendors for any one or more shifts for one or more days, recurring or not 3. Kids Activities Variables and Inputs Name each course, seating capacity for that course and all instructors who teach that course Input duration of each course (1 month, 2 month, Continuous, etc)

Input course occurrence frequency (daily, weekly, biweekly, monthly)

Input course occurrence day(s) (Mon, Tues, Wed, Thurs, Fri, Sat, Sun)

Input course timing for each occurrence day(s)

Web user 120 and mobile user 130 can use the system to book appointments on the scheduling platform 100. The ride-sharing and ordering process handles three possible usage scenario: 1) through the system's web site, 2) through a "Book Now" button 132, or 3) through a mobile application.

In one usage scenario, the rider visits the system's web site. The rider or user may browse or search the interface for a driver to suit their needs. In a mobile usage scenario, the user is directed to search for service providers from a mobile application. In one usage scenario, the user clicks on a "Book Now" button at a vendor's web site. The user is immediately transferred to an interface on the system's web site where the user can search for a date and time for a suitable appointment. Once a desired service is found, the user is presented with times and dates of available appointments. Once the desired time and date are chosen, the user is asked to log in to the system using an account. If the user does not yet have an account, he/she will create a user account. If the user account already exists, the user will simply log in. In another embodiment, the user logs in to an account previous to reserving a time and date. Once logged in, the appointment is scheduled with the user and driver. In some instances, approval for the appointment is not required. If this is the case, the appointment is automatically saved to the calendar of the user for later viewing or reminder. A notification email is also sent to the user. In another instance, approval is required by the vendor. In this case, the appointment is placed on the approval queue of the vendor.

One example use scenario is described next. In one embodiment with the Uber system, a web user visits uber.com and search for a vendor or service provider. Once the desired provider is found, the user can then search for a time and date to reserve an appointment with the vendor. If the user does not already have a user account, he will be asked to create one. The user then logs in to schedule the appointment with the vendor. If approval is required by the vendor, then the appointment is placed on an approval queue (240). If not, the date and time are saved to a user's calendar, and an email confirming the appointment is sent to the user. From the vendor's view point, the provider visits a web site and creates an account and then logs in. Once signed in, the provider profile can be created or reviewed. In the event of a new business profile, the vendor will also have to upload its existing schedule data onto the platform. From this point, the vendor can also input manually booked reservations into the platform and update the schedule database.

In exemplary capacity utilization maximization process, the system takes user inputs from the web site, "Book Now" widget, and the mobile app, among others. The system also monitors the service provider calendar for open time slots. Such information is stored in an available slot database in the scheduling software. In this example, the system knows the user's interest and the user's open time slots. The system also knows the service provider's total capacity and open time slots. By having both information, the system can optimize the calendars of both the user and service provider. For example, the system can recommend a different date that fits best with the user's travel path and the capacity of the service provider. In another example, the system can automatically recommend a different location of the selected service provider that fits better due to open time slots at the different location. Other optimizations can be done as well. The system takes into consideration a total capacity limit, which is the total number of customers that can be served by a given service over a given time period. The total capacity may vary based on the size of the staff currently on duty, etc. The process can use linear scheduling and non-linear scheduling techniques. In one illustrative embodiment, the capacity utilization is based on not only a maximum total capacity over a given time period, but also a number of appointments which can be started at any given time. In one embodiment, a database structure is used to represent both maximum capacity and start time capacities to allow efficiency in searching for open appointment times and scheduling requested appointments. In another embodiment, the system utilizes various artificial intelligence (AI) based methodologies as well as a commercially available expert system shell.

In another embodiment, the system can offer discounts to riders to visit the business if the booking for that business is below a threshold. In this manner, the business can run dynamic sales as needed.

Figure 7:
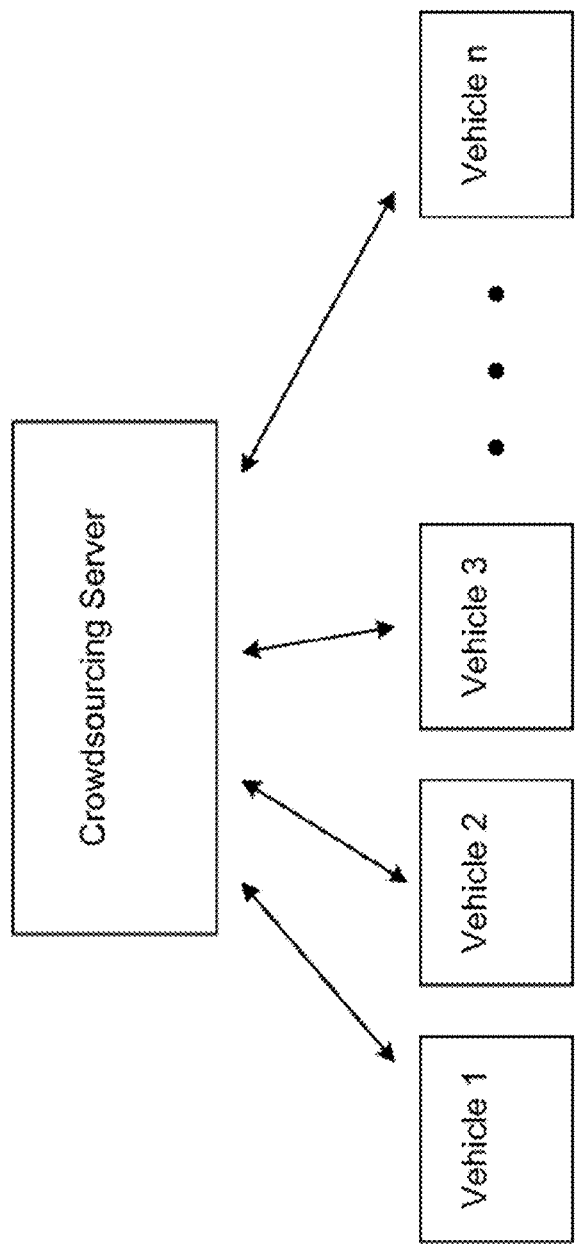
FIG. 7 shows exemplary systems for capturing navigation data and using such data for smart vehicles.

FIG. 7 shows an exemplary system for crowd-sourcing navigation data. The system includes a crowdsourcing server in communication with a plurality of vehicles 1 . . . n. The vehicles in FIG. 7 performs peer-to-peer discovery and crowd-sourced navigation as shown in FIG. 9B. The system receives proximity services for a group of vehicles traveling a predetermined route using peer-to-peer discovery, receives crowdsourcing data from said plurality of vehicles, sharing crowdsourcing data to the group of vehicles (or a subsequent group of vehicles) traveling the route of interest. Such information can be used in providing navigation guidance to the vehicle traveling the route using the crowdsourced data.

In one aspect, the vehicles traveling the same route can be determined using a vehicle to vehicle communication protocol that facilitate identifying peers based upon encoded signals during peer discovery in a peer to peer network. The system can be WiFi or cellular based such as the Proximity Services via LTE Device Broadcast, among others.

In one embodiment, the identification of peers based upon encoded signals during peer discovery in a peer to peer network can be done. For example, direct signaling that partitions a time-frequency resource into a number of segments can be utilized to communicate an identifier within a peer discovery interval; thus, a particular segment selected for transmission can signal a portion of the identifier, while a remainder can be signaled based upon tones communicated within the selected segment. Moreover, a subset of symbols within the resource can be reserved (e.g., unused) to enable identifying and/or correcting timing offset. Further, signaling can be effectuated over a plurality of peer discovery intervals such that partial identifiers communicated during each of the peer discovery intervals can be linked (e.g., based upon overlapping bits and/or bloom filter information). The method can include transmitting a first partial identifier during a first peer discovery interval. Also, the method can comprise transmitting a second partial identifier during a second peer discovery interval. Further, the method can include generating bloom filter information based upon the combination of the first partial identifier and the second partial identifier. Moreover, the method can comprise transmitting the bloom filter information to enable a peer to link the first partial identifier and the second partial identifier.

Another embodiment communicates using LTE Direct, a device-to-device technology that enables discovering thousands of devices and their services in the proximity of ~500 m, in a privacy sensitive and battery efficient way. This allows the discovery to be "Always ON" and autonomous, without drastically affecting the device battery life. LTE Direct uses radio signals—called 'expressions'—which can be private and discreet (targeted securely for certain audiences only) or public (transmitted so that any application can receive them). Public expressions are a common language available to any application to discover each other, and this is the door to consumer utility and adoption. Public expressions exponentially expand the field of value. For example, vehicles that share same driving segments can broadcast expressions indicating their path(s). The system detects vehicles in the same segment as part of the proximity services for capturing and sharing crowd-sourced navigation data. Public expressions combine all applications—all value—into one single network, thereby expanding the utility of the system.

The crowdsourcing data includes vehicle performance information and GPS locations of a vehicle; and wherein the vehicle data includes odometer information, speedometer information, fuel consumption information, steering information.

The data includes information relating to closing of a lane using the crowdsourcing data; predicting an avoidance maneuver using the crowdsourcing data; predicting a congestion with respect to a segment of the route of the at least one vehicle using the crowdsourcing data; and predicting traffic light patterns using the crowdsourcing data.

The system can determine the presence of obstacles in a road lane by monitoring a pattern of vehicle avoidance of a particular location of the lane. The obstacles can be rocks or debris on the lane, closure of a lane, inoperative vehicles on the lane, or vehicles suffering from an accident, among others. The vehicular avoidance information can be sent to vehicles that are planning to use that particular road section to optimize The system can detect closing of a lane by monitoring changes of vehicle direction at a location on the route of the at least one vehicle; and determining a lane is closed in response to a number of changes of vehicle direction being larger than a predetermined threshold value.

The system can share prior vehicle's avoidance maneuver by monitoring change of vehicle direction and distance traveled at a close vicinity of a location on the route of a lead vehicle; and determining an avoidance maneuver in response to a ratio of change of vehicle direction and distance traveled being less than a predetermined threshold value.

The system can determine a route based at least in part on an amount of time predicted for travelling from a starting location to a destination location of the route using the crowdsourcing data; and determining a route based at least in part on a predicted fuel consumption of the route using the crowdsourcing data. The determining information corresponding to a route of interest to at least one vehicle further can include monitoring a distance traveled by the at least one vehicle after reaching a destination, and predicting availability of parking spaces at the destination based at least in part on the distance traveled; and monitoring an amount of time traveled by the at least one vehicle after reaching a destination, and predicting availability of parking spaces at the destination based at least in part on the amount of time traveled. The determining information corresponding to a route of interest to at least one vehicle further comprises: measuring a time taken to travel a predefined percent of the route until the at least one vehicle comes to a halt at a predetermined location; and predicting an average amount of time used to find parking at the predetermined location using the time taken to travel a predefined percent of the route. The determining information corresponding to a route of interest to at least one vehicle further comprises at least one of: determining popularity of a fueling station along the route; determining type of fuel sold at the fueling station along the route; determining popularity of a business along the route; and determining popularity of a rest area along the route.

Figure 8:
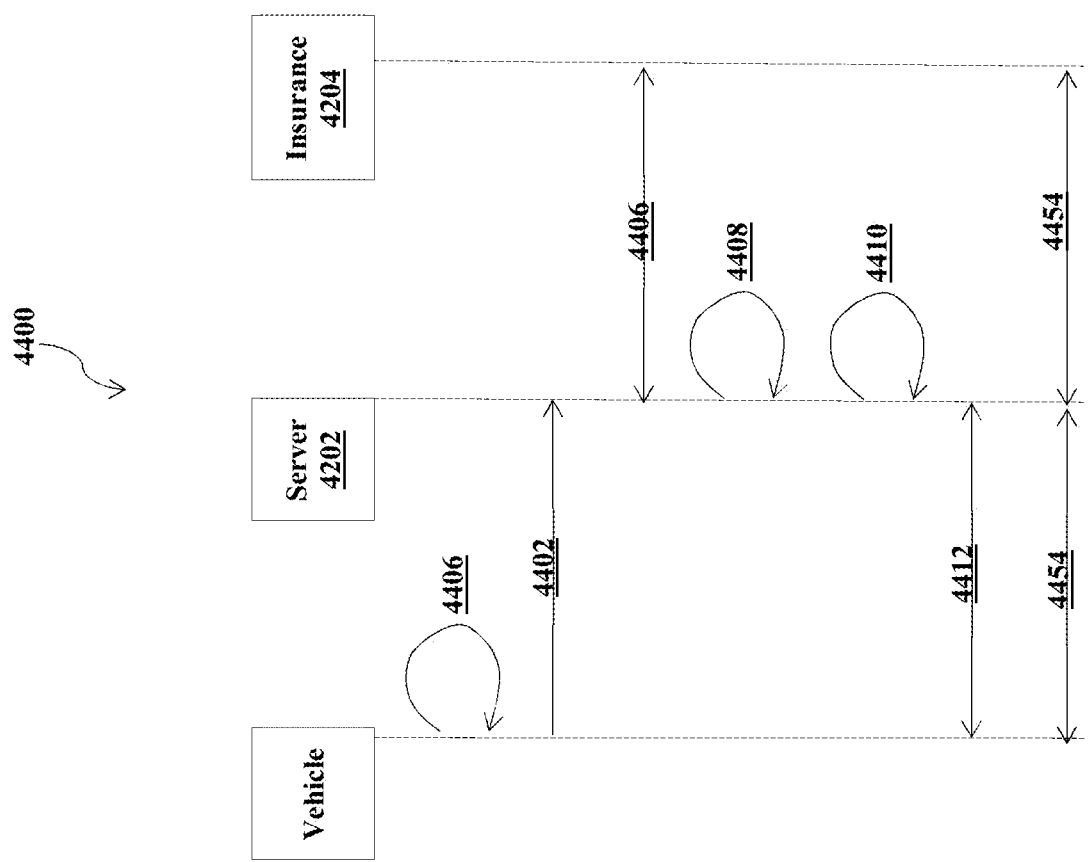
FIG. 8 is a sequence diagram illustrates generally operations performed by the system.

FIG. 8 is a sequence diagram illustrates generally, operations performed by the system according to embodiments described herein. In an embodiment, at 4402, the driver monitoring unit 104 can be configured to monitor the behavior of the driver. The system can be configured to include the driver monitoring unit 4104 installed in the vehicle 102 to monitor the behavior parameters of the driver while the vehicle 4102 is being driven. The vehicle 4102 can include cameras, gyroscope, magnetometer, accelerometer, and other sensors installed thereon to monitor the behavior parameter of the driver. In an embodiment, the cameras or sensors may be placed at any place in the vehicle, such as for example at four corners of the front windshield, in a way that it can directly capture the behavior parameters of the driver. For example, based on the driver gestures, the cameras can detect finger position to detect that driver is pointing at a particular object or vehicle and searches the internet for the vehicle. Further, in an embodiment, a flexible display film adhesively secured on the front windshield. The display can be used controlled by a computer to display info in a discrete way that may not take driver's eyes off the road and opposing vehicles. In an embodiment, at 4404, the driver monitoring unit 4102 can be configured to transmit the behavior parameters of the driver to the server 4106. In an embodiment, the driver behavior parameters described herein can include for example, but not limited to, vehicle speed, vehicle accelerations, driver location, seatbelt use, wireless device use, turn signal use, driver aggression, detection of CO2 vapor, detection of alcohol, driver seating position, time, and the like. In an embodiment, at 4406, the server 4106 can be configured to transmit the driver behavior parameters to one or more insurance providers. In an embodiment, at 4408, the server 4106 can be configured to analyze the driver behavior parameters and adjust the insurance rates for the driver. For example, if the driver is driving roughly by drinking alcohol then the insurance rate may get decreased. In an embodiment, at 4410, the server 4106 can be configured to match the driver behavior preferences with similar or substantially similar preferences of other drivers. The server 4104 can be configured to generate action recommendations best matching the behavior of the driver. In an embodiment at 4412, the server 4106 can be configured to provide the generated recommendations to the driver. Based on the driver behavior parameters the sever 4106 provides feedback and recommendations to the driver, such as to improve the driving skills. Further, in an embodiment, a flexible display film adhesively secured on the front windshield. The display can be used controlled by a computer to display info in a discrete way that may not take driver's eyes off the road and opposing vehicles. In an embodiment, at 4414, the server 4106 can be configured to frequently monitor the behavior parameters associated with the driver. Any changes in the behavior parameters can affect the overall system performance and the driver experience. The server 4106 can be configured to frequently monitor and dynamically update the insurance rate and action recommendations, which in turn helps the driver for effectively improving the driving skills.

Figure 9:
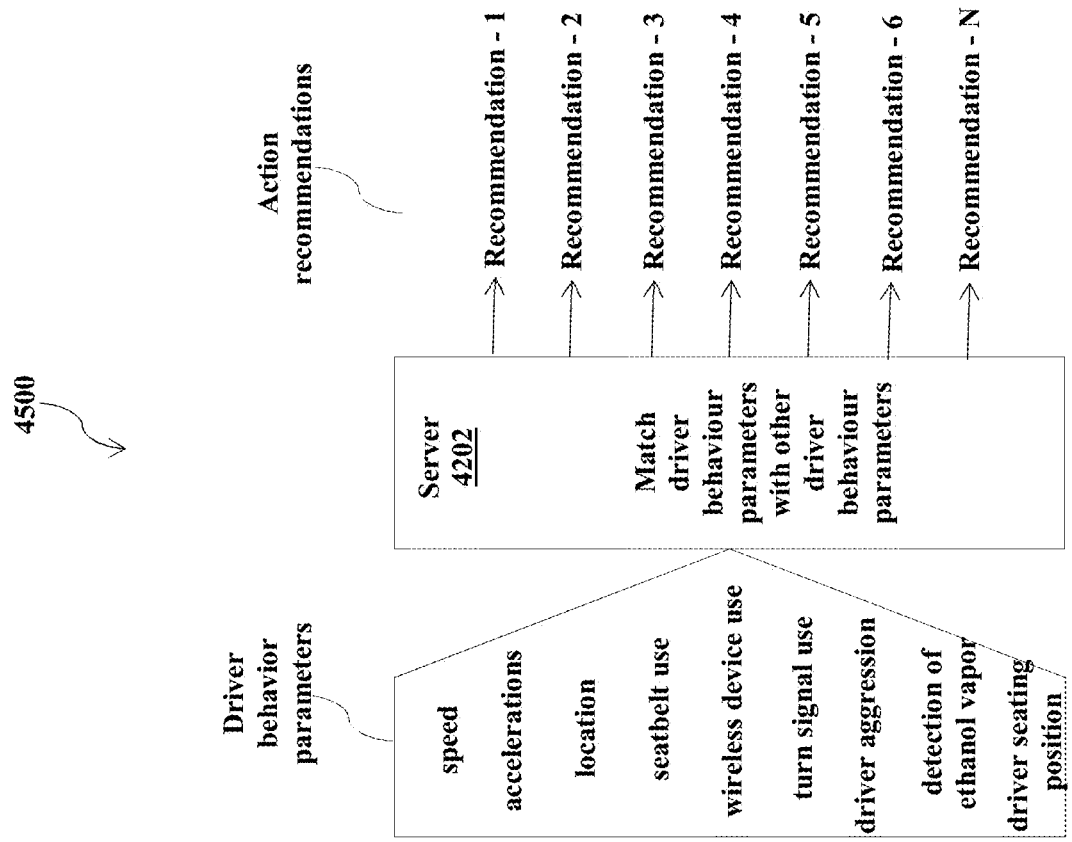
FIG. 9 is a diagram illustrates generally, an overview of a recommender system that may allow drivers to obtain action recommendations based on the driver behavior parameters, according to embodiments disclosed herein.

FIG. 9 is a diagram 4500 illustrates generally, an overview of a recommender system that may allow drivers to obtain action recommendations based on the driver behavior parameters, according to embodiments disclosed herein. In an embodiment, the driver behavior parameters can be used to provide customized recommendations to drivers by comparing the driver behavior parameters with other drivers who has similar or substantially similar behavior parameters. Unlike conventional system, the server 106 can be configured to adaptively generate action recommendations for the driver based on the behavior parameters. The server 106 can be configured to match the behavior parameters of the drivers to similar behavior parameters of the one or more drivers, such as to provide personalized action recommendations to the driver. In an embodiment, the recommendations can be filtered in advance of display. In an embodiment, filtered recommendations may be derived from the sources such as for example, but not limited to, those sources that have added the data within a specified time, from those sources that share specific similarities with the sources, those sources that have been preselected by the driver as relevant, those sources that are selected as friends or friends of friends, and the like, those sources that are determined to provide valuable reviews/ratings or are specifically declared to be experts within the system or by the driver, or those users that have entered at least a minimum amount of data into the system.

Figure 10:
FIG. 10 is a diagram illustrates generally, an overview of preferences matching by the server, according to embodiments disclosed herein.

FIG. 10 is a diagram 4600 illustrates generally, an overview of preferences matching by the server 4106, according to embodiments disclosed herein. The FIG. 10 outlines recommender functionality in accordance with an embodiment of the present invention. The system 4100 can monitor the driver behavior and uses the behavior data to match with the behavior data of other sources and provide action recommendations to the driver. For example, if the driver behavior parameter indicates that the user is driving very fast (such as 70 kmph) in school zone where the speed limits should be more than 30 kmph then the system can be configured to execute one or more rules and provide suggestions to the driver to slow down the speed.

In an embodiment, the activity recommendation rules may be established in the recommendation system. Such rules derived from, for example, but not limited to, automatic generation machine learning, automatic generation using a generic algorithm, automatic generation using a neutral network, automatic generation using a rule inference system, data mining, generation using a preset list of recommendations, and/or a driver behavior. In an embodiment, the sever 106 can be configured to receive the recommendation rules such as unidirectional rules, bidirectional rules, generalized rules including multi-way rules, rules among items, rules among sets, rules among collections, rules with weight factors, rules with priorities, un-weighted and un-prioritized rules, and the like.

Figure 11:
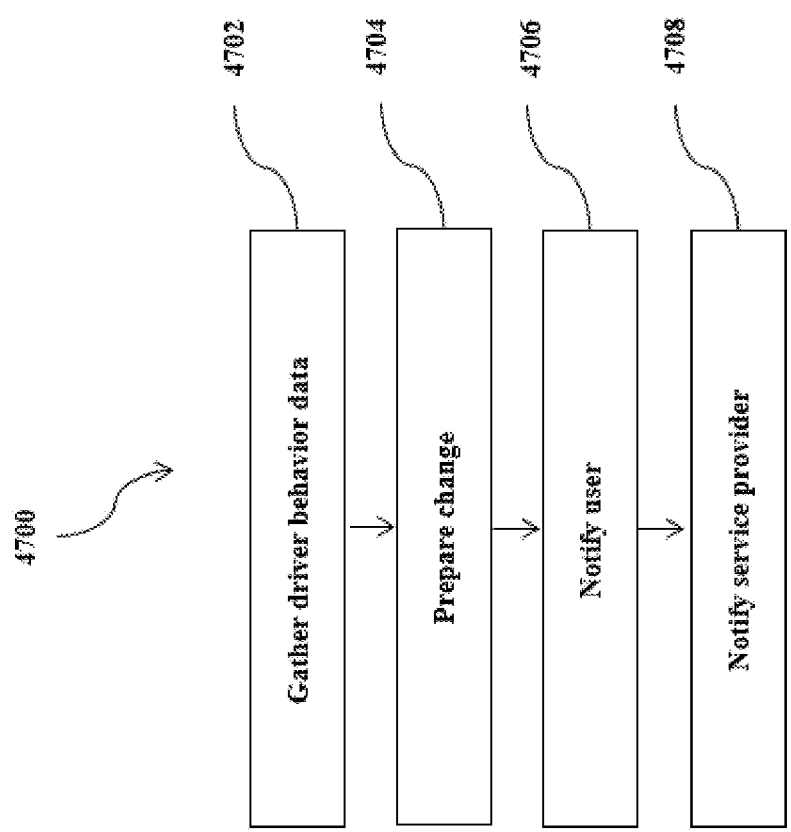
FIG. 11 is a flow chart illustrates generally, a method for selectively providing insurance information to a service provider, according to embodiments as disclosed herein.

FIG. 11 is a flow chart illustrates generally, a method 4700 for selectively providing insurance information to a service provider, according to embodiments as disclosed herein. At step 4702, the driver behavior is monitored. The behavior data can include external parameters and/or internal parameters. In an embodiment, the driver behavior data/parameters described herein can include for example, but not limited to, vehicle speed, vehicle accelerations, driver location, seatbelt use, wireless device use, turn signal use, driver aggression, detection of ethanol vapor, driver seating position, time, and the like. In an embodiment, the behavior data can be over a period of hours, days, weeks, and so forth. In an embodiment, the behavior data gathering can be continuous, at predefined intervals, or at random intervals. In accordance with some aspects, data can be gathered while a vehicle is in operation and at other times (e.g., at two a.m. to determine where the vehicle is parked overnight). In an embodiment, a change to an insurance premium and/or an insurance coverage is prepared, at 4704. The change is based on one or more of the driver behavior data, wherein each item of driver behavior data can have a different weight assigned. For example, data gathered related to weather conditions might be given less weight than data gathered related to user distractions (e.g., passengers, use of a mobile device while vehicle is in operation, and so forth). In another example, excessive speed might be assigned a higher weight than data related to safety performance of the vehicle. As such, data with a higher weight can be given more consideration than data with a lower weight (e.g., data assigned a higher weight can have a greater impact on the cost of insurance). Thus, if the user is traveling at (or below) the speed limit and speed is assigned a greater weight, then the safe speed will tend to decrease (or remain constant) the cost of insurance.

In an embodiment, the driver is notified of the change, at 4706. The notification can be in any perceivable format. In an example, the notification is provided as a dashboard-mounted display. In another example, presenting the change can include displaying the modified cost of the insurance policy in a dashboard-mounted display and/or a heads-up display. In an embodiment, a service provider is notified of the change, at 708. At substantially the same time as notifying the service provider (or trusted third party) of the change, parameters taken into consideration (and associated weight) can also be provided. In such a manner, the service provider (or third party) can selectively further modify the cost of insurance, which can be communicated to the user though the vehicle display or through other means.

The service provider (or third party) might be provided the change information less often than the insurance cost change information is provided to the user. For example, the user can be provided the insurance cost change information dynamically and almost instantaneously with detection of one or more parameters that can influence the insurance cost. However, the insurance provider (or third party) might only be notified of the change after a specified interval (or based on other intervals). For example, insurance cost changes might be accumulated over a period of time (e.g., two weeks) and an average of the insurance cost changes might be supplied to insurance provider. In such a manner, the user has time to adjust parameters that tend to increase (or decrease) the cost of insurance, which allows the user to have more control over the cost of insurance.

In an embodiment, vertical market specialization for insurance is provided where markets are defined based on granular aspects of coverage and presented to one or more insurance subsystems to obtain quotes for a coverage premium. Such specialization allows insurance companies to compete in more specific areas of insurance coverage, which allows for more accurate premium rates focused on the specific areas or one or more related scenarios. In addition, the granular aspects of coverage can be provided to one or more advertising systems in exchange for further lowered rates, if desired.

According to an example, an insurance market can be defined based on granular information received regarding an item, a related person, use of the item, etc. Based on the market, premium quotes can be obtained from one or more insurance subsystems related to one or more insurance brokers. In addition, rates can be decreased where the granular information can be provided to an advertising system, in one example. In this regard, targeted advertisements can additionally be presented to system related to requesting the insurance coverage. Policies can be automatically selected based on preferences, manually selected using an interface, and/or the like.

Figure 12:
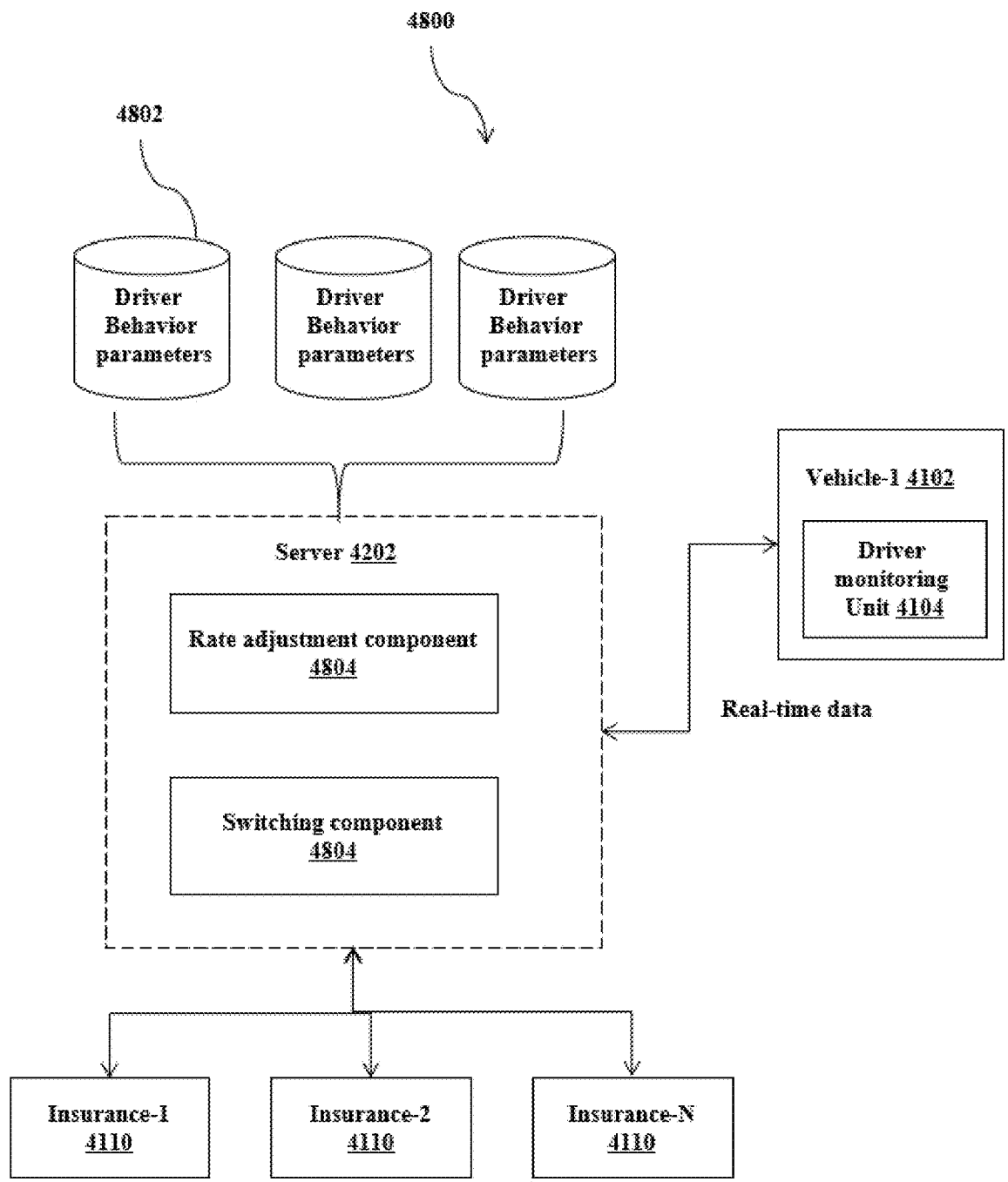
FIG. 12 is a diagram illustrates generally, an exemplary system that customizes insurance rates to correspond to behavior driver, according to embodiments as disclosed herein.

FIG. 12 is a diagram 4800 illustrates generally, an exemplary system that customizes insurance rates to correspond to behavior driver, according to embodiments as disclosed herein. In an embodiment, the server 4106 can be configured to maintain a database component 4802 including data related to different driver behaviors. Such leveraging from data banks enables insurance providers to bid in real time, and hence an owner and/or user of a vehicle can benefit from competition among various insurance providers, to obtain optimum rates. The server includes a rate adjustment component 4804 that in real time can determine the various rates from a plurality of insurance providers 4110 (1 to N, where N is an integer). In one particular aspect, a retrieval agent (not shown) associated with the rate adjustment component 4804 can pull insurance data from the insurance providers based on the contextual data supplied thereto. For example, such contextual data can be data records related to driver behavior, the vehicle 4102 (such as auto shop service records, current service status for the car, and the like), data related to the individual driver (such as health records, criminal records, shopping habits, and the like), data related to the environment (road condition, humidity, temperature, and the like) and data related to real time driving (frequency of braking, accelerating, intensity of such actions, and the like).

The retrieval agent (not shown) can pull data from the insurance providers 4110 and further publish such data to enable a rich interaction between the users on a display or a within a written communication environment. The retrieval agent can further generate an instance for a connection with the insurance providers. Accordingly, a connection instance can be employed by the rate adjustment component 4804 to store connection information such as the state of data conveyance, the data being conveyed, connection ID and the like. Such information can additionally be employed to monitor progress of data transfer to the written communication environment or display, for example.

Accordingly drivers/owners of motor vehicles can pull or receive data from the insurance providers 4110, wherein received data can be posted (e.g., displayed on a monitor) and the connection instance can be concurrently updated to reflect any successful and/or failed data retrievals. Thus, at any given moment the connection instance can include the most up-to-date version of data transferred between the motor vehicle and the insurance providers. In an embodiment, a switching component 4806 can be configured to automatically switch user/driver to an insurance provider/company that bids the best rate. Such switching component 4806 can employ interrupts both in hardware and/or software to conclude the switching from one insurance provider to another insurance provider. For example, the interrupt can convey receipt of a more optimal insurance rate or completion of a pull request to the insurance providers 4110 or that a configuration has changed. In one particular aspect, once an interrupt occurs, an operating system analyzes the state of the system and performs an action in accordance with the interrupt, such as a change of insurance provider, for example Such interrupts can be in form of asynchronous external events to the processor that can alter normal program flow. Moreover, the interrupts can usually require immediate attention from a processor(s) associated with the system. In one aspect, when an interrupt is detected, the system often interrupts all processing to attend to the interrupt, wherein the system can further save state of the processor and instruction pointers on related stacks.

According to a further aspect, the switching component 4804 can employ an interrupt dispatch table in memory, which can be accessed by the processor to identify a function that is to be called in response to a particular interrupt. For example, a function can accept a policy from an insurance provider, cancel an existing policy, and/or clear the interrupt for a variety of other reasons. The function can execute processes such as clearing the state of the interrupt, calling a driver function to check the state of an insurance policy and clearing, setting a bit, and the like.

Figure 13:
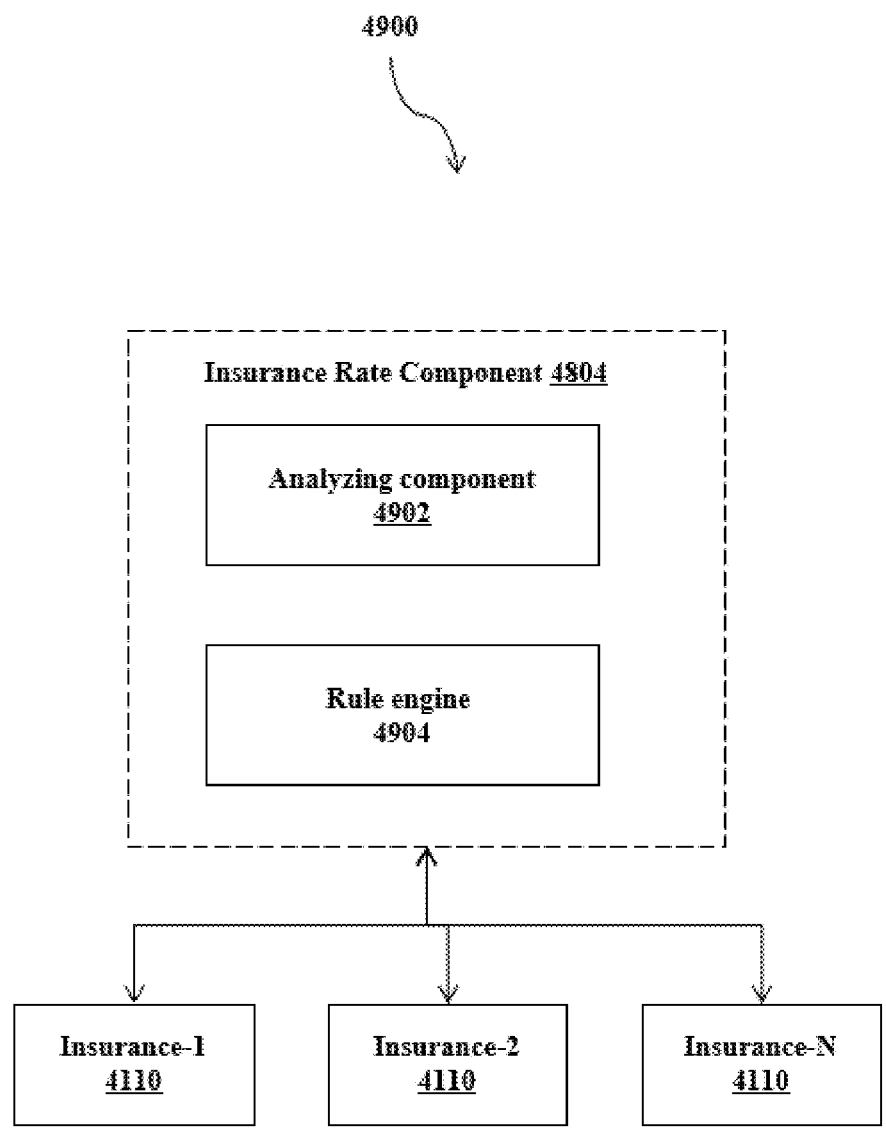
FIG. 13 is a diagram illustrates generally an insurance rate adjustment component that further includes an analyzer component, according to embodiments as disclosed herein.

FIG. 13 is a diagram 4900 illustrates generally, the switching component 806 that further includes an analyzer component 4902, which further employs threshold ranges and/or value(s) (e.g., pricing ranges for insurance policies, terms of the insurance policy, and the like) according to a further aspect of the present invention. The analyzer component 4902 can be configured to compare a received value for insurance coverage to the predetermined thresholds, which can be designated by an owner/driver. Accordingly, the analyzer component 902 can determine if the received insurance coverage policies are within the desired range as specified by a user an "accept" or "reject", and/or further create a hierarchy from "low" to "high" based on criteria designated by the user (e.g., price of the insurance policy, terms of the insurance policy, and the like).

According to a further aspect, the analyzer component 4902 can further interact with a rule engine component 4904. For example, a rule can be applied to define and/or implement a desired evaluation method for an insurance policy. It is to be appreciated that the rule-based implementation can automatically and/or dynamically define and implement an evaluation scheme of the insurance policies provided. Accordingly, the rule-based implementation can evaluate an insurance policy by employing a predefined and/or programmed rule(s) based upon any desired criteria (e.g., criteria affecting an insurance policy such as duration of the policy, number of drivers covered, type of risks covered, and the like.).

In a related example, a user can establish a rule that can implement an evaluation based upon a preferred hierarchy (e.g., weight) of criteria that affects the insurance policy. For example, the rule can be constructed to evaluate the criteria based upon predetermined thresholds, wherein if such criteria does not comply with set thresholds, the system can further evaluate another criteria or attribute(s) to validate the status (e.g., "accept" or "reject" the insurance bid and operate the switching component based thereon). It is to be appreciated that any of the attributes utilized in accordance with the subject invention can be programmed into a rule-based implementation scheme.

Figure 14:
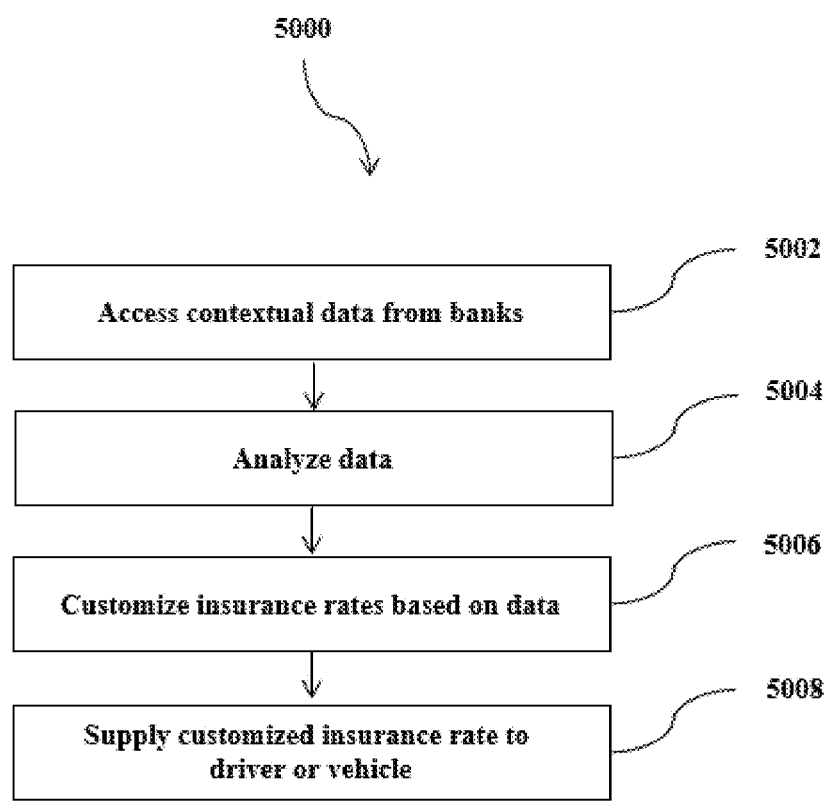
FIG. 14 illustrates generally, a method for customizing insurance rates of a driver, according to embodiments as described herein.

FIG. 14 illustrates generally, a method 5000 for customizing insurance rates of a driver, according to embodiments as described herein. The methodology 5000 of customizing insurance rates according to a further aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 5002 contextual data from various data banks can be accessed by the insurance providers or supplied thereto. As explained earlier, the data banks can include data pertaining to the motor vehicle (e.g., maintenance history, current vehicle conditions, and the like), data related to the driver (e.g., via health insurance records, police records, internet records, and the like), and data related to operating environment (e.g., weather, geographical location, and the like.) Moreover, the real-time contextual driving data can include both an intensity portion and a frequency portion, which represent severity and regularity of driving episodes (e.g., slamming the brakes, gradual/sudden deceleration, velocity variances, and the like). Subsequently and at 5004, such data can be analyzed by the insurance providers as to customize an insurance rate based thereon at 5006. In an embodiment, insurance rate can be calculated in real-time and as such can more accurately reflect appropriate coverage for a situation of a driver. A plurality of different factors can influence a likelihood of the driver being involved in an accident, having a vehicle stolen, and the like. For example, if the driver is travelling through bad weather, then risk can be higher and a rate can be increased in real-time as weather conditions change-conversely, if there is relatively little traffic surrounding the driver's vehicle, then the rate can be lowered. An algorithm or complex model can be used to calculate the insurance rates and can be disclosed to the driver through the display. In an embodiment, the rate adjustment component 804 can be configured to evaluate the insurance rate information against current vehicle operation by the driver. Specifically, the evaluation can compare the current operation against insurance rate information to determine if an appropriate rate is being used, if the rate should be changed, what the change should be, etc. For instance, different aspects of vehicle operation can be taken into account such as for example, but not limited to, weather and how a driver reacts, speed (of a vehicle), traffic and how the driver reacts, and noise {e.g., radio level), and the like.

Subsequently, the customized insurance rate can then be sent from an insurance provider to an owner/driver of the vehicle (e.g., in form of an insurance bid) at 5008. For example, the insurance rate can be determined and represented upon the driver via the display or controller in the vehicle. A processor that executes the computer executable components stored on a storage medium can be employed. In an embodiment, the monitoring unit can communicate with an insurance company {e.g., continuous communication) and obtain an insurance rate directly. The system can be configured to customize the insurance based on the obtained insurance rates and present to the driver and make appropriate modification to the display automatically.

Figure 15A:
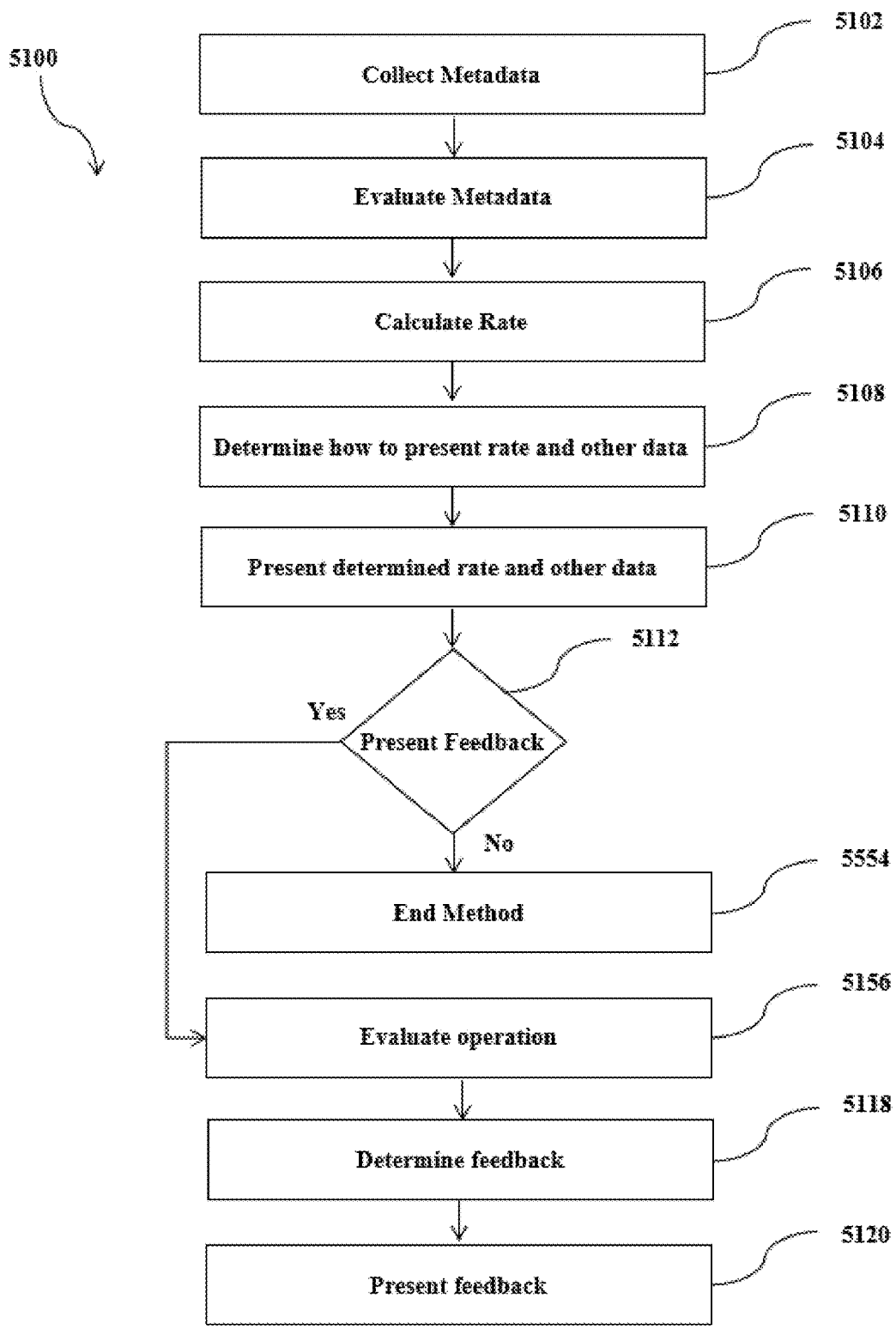

FIG. 15 illustrates generally, a method 5100 for presenting information related to a real-time insurance rate, according to embodiments as described herein. In an embodiment, at 5102, Metadata can be collected pertaining to real-time operation of a vehicle and at least a portion of the metadata can be evaluated, as shown at 5104. The metadata described herein can include driver behavior data, contextual information, driver history, and real-time driving information that relates to operation of a driver and vehicle, and the like. Based upon a result of the evaluation, there can be calculation a real-time insurance rate, such as shown at 5106. In an embodiment, at 5108, determination can be made on how to present the calculated rate. For example, the determination can be if the rate should be shown on a center console or a heads-up display. A determination can also be made on how to display data (e.g., if a numerical rate should be disclosed or a color element should be lit). Additionally, a determination can be made on other data to disclose, such as safety, environment impact, cost of operating vehicle, a target speed, group rank, and the like. The determined rate and other determined data can be presented through a display, such as shown at 5110. Thus, the determined rate is presented upon a display viewable to the driver of the vehicle.

In an embodiment, at 5112, the method 5100 includes determining if feedback should be presented to the user. The feedback can be supplied in real-time as well as be a collective summary presented after a driving session is complete. If no feedback should be presented, then the method 5100 can end at 5114. In one instance, if there is a new driver attempting to obtain a full drivers license (e.g., teenage driver) or newer driver, then the check 5112 can determine feedback should be automatically provided. In another embodiment, an operator can be solicited on if feedback should be presented depending on a response the method 5100 can end or continue.

Operation of the vehicle and driver can be evaluated at 5116, which can occur though different embodiments. As a user operates a vehicle, metadata can be collected and evaluated in real-time. In an alternative embodiment, data can be collected, but evaluation does not occur until the check 5112 determines feedback should be presented. At 5118, there can be determining feedback for suggesting future driving actions for the operator to perform in future driving to lower the insurance rate. The method 5100 can include presenting the feedback (e.g., through the display, through a printout, transferring feedback as part of e-mail or a text message, etc.) at 5120. The feedback can be directly related to a driving session as well as is an aggregate analysis of overall driving performance (e.g., over multiple driving sessions).

FIG. 16 is diagram illustrates generally, a method 5200 for installation of a real-time insurance system, according to embodiments disclosed herein. In an embodiment, at 5202, an on-board monitoring system (such as driver monitoring unit) 4102 is installed in a vehicle to facilitate the collection of real-time data from the vehicle and forwarding of the real-time data to an insurance provider. At 5204, the on-board monitoring system can be associated with the on-board data/diagnostic control units and system(s) incorporated into the vehicle. The on-board data/diagnostic control units and system(s) can include the vehicles engine control unit/module (ECU/ECM), transmission control unit (TCU), power train control unit (PCU), on-board diagnostics (OBD), sensors and processors associated with the transmission system, and other aspects of the vehicle allowing the on-board monitoring system to gather sufficient data from the vehicle for a determination of how the vehicle is being driven to be made. The on-board monitoring system can be communicatively coupled by hard wiring to the on-board diagnostic system(s) or the systems can be communicatively associated using wireless technologies.

In an embodiment, at 5206, a mobile device (e.g., a cell phone) can be associated with the onboard monitoring system where the mobile device can facilitate communication between the on-board monitoring systems with a remote insurance provider system. The mobile device provides identification information to the on-board monitoring system to be processed by the on-board monitoring system or forwarded an insurance provider system to enable identification of the driver.

In an embodiment, at 5208, communications are established between the on-board monitoring system and the mobile device with the remote insurance provider system. In one embodiment it is envisaged that the on-board monitoring system and the insurance provider system are owned and operated by the same insurance company. However, the system could be less restricted whereby the insurance provider system is accessible by a plurality of insurance companies with the operator of the on-board monitoring system, e.g., the driver of the vehicle to which the on-board monitoring system is attached, choosing from the plurality of insurance providers available for their particular base coverage. In such an embodiment, upon startup of the system the insurance provider system can default to the insurance company providing the base coverage and the operator can select from other insurance companies as they require. Over time, as usage of the on-board monitoring system continues, at 5210, there is a likelihood that various aspects of the system might need to be updated or replaced, e.g., software update, hardware updates, etc., where the updates might be required for an individual insurance company system or to allow the on-board monitoring system to function with one or more other insurance company systems. Hardware updates may involve replacement of a piece of hardware with another, while software updates can be conducted by connecting the mobile device and/or the on-board monitoring system to the internet and downloading the software from a company website hosted thereon. Alternatively, the software upgrade can be transmitted to the mobile device or the on-board monitoring system by wireless means. As a further alternative the updates can be conferred to the mobile device or the on-board monitoring system by means of a plug-in module or the like, which can be left attached to the respective device or the software can be downloaded there from.

Figure 17:
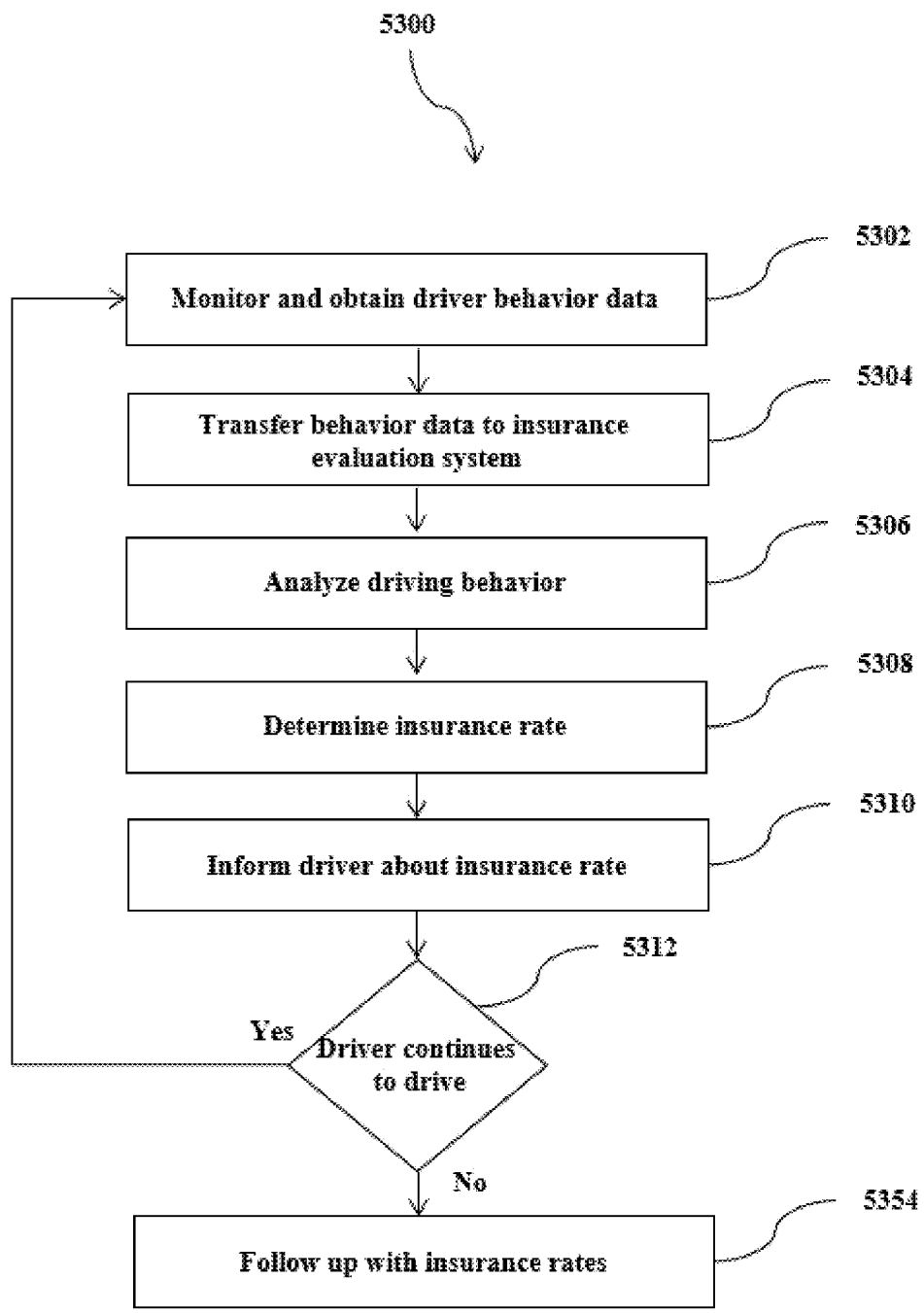
FIG. 17 is a diagram illustrates generally, a method for gathering information from an on-board monitoring system employed in a real-time insurance system, according to embodiments as disclosed herein.

FIG. 17 is a diagram illustrates generally, a method for gathering information from an on-board monitoring system employed in a real-time insurance system, according to embodiments as disclosed herein. In an embodiment, at 5302, monitoring of the driver and the vehicle they are operating is commenced. Monitoring can employ components of an on-board monitoring system, mobile device components, e.g., cell phone system, or any other system components associated with monitoring the vehicle as it is being driven. Such components can include a global positioning system (GPS) to determine the location of the vehicle at any given time, such a GPS can be located in a cell phone, as part of the on-board monitoring system, or an external system coupled to the monitoring system/cell phone—such an external system being an OEM or after sales GPS associated with the vehicle to be/being driven. A video data stream can be gathered from a video camera coupled to the on-board monitoring system recording the road conditions, etc. throughout the journey. Information can also be gathered from monitoring/control system(s) that are integral to the vehicle, e.g., the vehicle's engine control unit/module (ECU/ECM) that monitors various sensors located throughout the engine, fuel and exhaust systems, etc.

In an embodiment, at 5304, the dynamically gathered data (or driver behavior data) is transmitted to an insurance evaluation system. In an embodiment, at 5306, the gathered data is analyzed. Such analysis can involve identifying the route taken by the driver, the speed driven, time of day the journey was undertaken, weather conditions during the journey, other road traffic, did the user use their cell phone during the journey?, and the like. In an embodiment, at 5308, the gathered data is assessed from which an insurance rate(s) can be determined. For example, if the driver drove above the speed limit then an appropriate determination could be to increase the insurance premium. In an embodiment, at 5310, the driver can be informed of the newly determined insurance rate. Any suitable device can be employed such as informing the user by cell phone, a display device associated with the on-board monitoring system, or another device associated with the vehicle. The information can be conveyed in a variety of ways, including a text message, a verbal message, graphical presentation, change of light emitting diodes (LED's) on a display unit, a HUD, etc. At 5312, the driver can continue to drive the vehicle whereby the method can return to 5302 where the data gathering is commenced once more.

Alternatively, in an embodiment, at 5312, the driver may complete their journey and data gathering and analysis is completed. In an embodiment, at 5314 the driver can be presented with new insurance rates based upon the data gathered while they were driving the vehicle. The new insurance rates can be delivered and presented to the driver by any suitable means, for example the new insurance rates and any pertinent information can be forwarded and presented to the driver via a HUD employed as part of the real time data gathering system. By employing a HUD instantaneous notifications regarding a change in the driver's insurance policy can be presented while mitigating driver distractions {e.g., line of sight remains substantially unchanged). Alternatively, the on-board monitoring system can be used, or a remote computer/presentation device coupled to the real time data gathering system where the information is forwarded to the driver via, e.g., email. In another embodiment, the driver can access a website, hosted by a respective insurance company, where the driver can view their respective rates/gathered information/analysis system, etc. Further, traditional means of communication such as a letter can be used to forward the insurance information to the driver.

Figure 18:
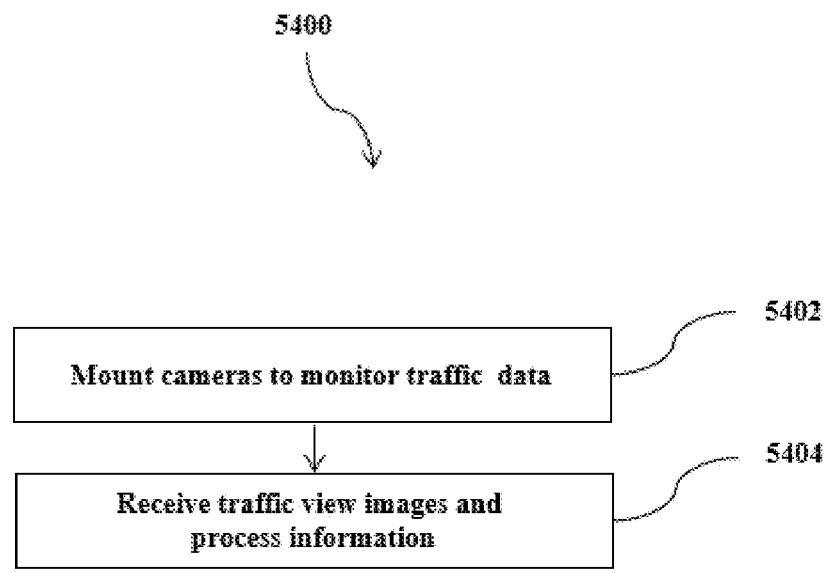
FIG. 18 is a diagram illustrates generally, a method mounting cameras to capture traffic information, according to embodiments as disclosed herein.

FIG. 18 is a diagram illustrates generally, a method 5400 mounting cameras to capture traffic information, according to embodiments as disclosed herein. In an embodiment, at 5402, the method 5400 includes mounting cameras on the car to monitor the traffic information. For example, the car may include cameras mounted to capture views in the rearward, downward, and the like directions, on the upper surface at the leading end of the front portion thereof. The position for mounting the cameras is not limited to the left side, right side, upper surface, front side, back side, and the like. For example, if the car has a left side steering wheel, the camera may be mounted on a right upper surface at a leading end of the front portion of the car. The cameras may have an angle of view of about 60, 90, 180, and 360 degree. With the construction, since the camera is mounted for a view in the rearward and downward directions on the front portion of the car, it can capture a wide area of the surface of the road in the vicinity of the driver's car, and an area in the vicinity of the left front wheel. Furthermore, the camera can also capture a part of the body of the car in the vicinity of the front wheel. Thereby, the relation between the car and the surface of the road can be recorded. In an example, the cameras can be configured to capture images of the road views including potential collision events such as how close car is following car in front, how often brake is used in period of time, hard brakes count more to reduce driver rating, how frequently does car come close to objects and obstructions (such as trees, cars on the other direction and cars in same direction) while moving.

In an embodiment, at 5404, the method 5400 includes receiving the recorded information from the camera and use image processing techniques to process the information. For example, the system uses image processing techniques to determine potential collision events such as how close car is following car in front, how often brake is used in period of time, hard brakes count more to reduce driver rating, how frequently does car come close to objects and obstructions (such as trees, cars on the other direction and cars in same direction) while moving.

Figure 19:
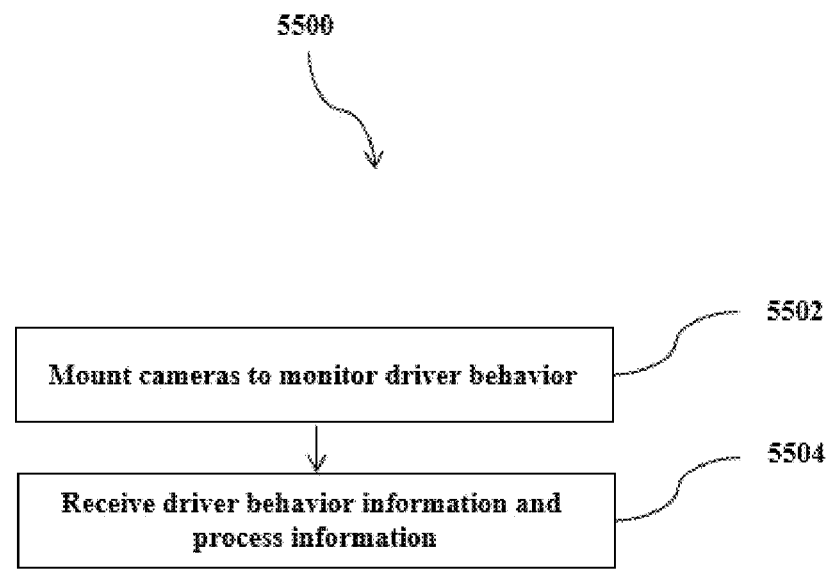
FIG. 19 is a diagram illustrates generally, a method mounting cameras to capture driver behavior, according to embodiments as disclosed herein.

FIG. 19 is a diagram illustrates generally, a method 5500 mounting cameras to capture driver behavior, according to embodiments as disclosed herein. In an embodiment, at 5502, the method 5500 includes mounting cameras on the car to monitor the driver behavior. The position for mounting the cameras is not limited to the left side, right side, upper surface, front side, back side, and the like. The cameras may have an angle of view of about 60, 90, 180, and 360 degree. For example, the camera can capture driver behavior such as for example, but not limited to, images of texting and use of phone while driving, speech of driver shouting or cursing at other drivers or other occupants, indications of intoxication, sleepiness, alcohol level, mood, aggressiveness, and the like. In an embodiment, at 5504, the method 5500 includes receiving the recorded information from the camera and use image processing techniques and voice reorganization techniques to process the information. For example, the system uses image processing techniques to determine the driver activity such as whether the driver is using mobile phone while driving. In another example, the system uses voice recognition techniques to determine the use voice, text, aggressiveness, and the like.

In an embodiment, the item-centric approach determines that many drivers having similar behavior and the driver who performs activity-A will also perform activity-B. This has proven to be fairly effective. On the other hand, many insurance providers interact with drivers online/offline. Such interaction can produce a stream of contextual information that recommendation engines can use. Early systems were batch oriented and computed recommendations in advance for each driver. Thus, they could not always react to a driver's most recent behavior. Recommendation engines work by trying to establish a statistical relationship between drivers and activities associated with there behavior. The system establishes these relationships via information about driver's behavior from vehicle owner, monitoring devices, sensors, and the like.

In an embodiment, the recommender systems collect data via APIs, insurance application, insurance databases, and the like sources. The insurance sources can be available through social networks, ad hoc and marketing networks, and other external sources. For example, data can be obtained from insurance sites, insurance providers, driver insurance history, and search engines. All this enables recommendation engines to take a more holistic view of the driver. The recommendation engine can recommend different insurance products that save money for the driver, or alternatively can even recommend different insurance companies to save money. Using greater amounts of data lets the engines find connections that might otherwise go unnoticed, which yields better suggestions. This also sometimes requires recommendation systems to use complex big-data analysis techniques. Online public profiles and preference listings on social networking sites such as Facebook add useful data.

Most recommendation engines use complex algorithms to analyze driver behavior and suggest recommended activities that employ personalized collaborative filtering, which use multiple agents or data sources to identify behavior patterns and draw conclusions. This approach helps determine that numerous drivers who have same or similar type of behavior in the past may have to perform one or more similar activities in the future. Many systems use expert adaptive approaches. These techniques create new sets of suggestions, analyze their performance, and adjust the recommendation pattern for similar behavior of drivers. This lets systems adapt quickly to new trends and behaviors. Rules-based systems enable businesses to establish rules that optimize recommendation performance.

Figure 20:
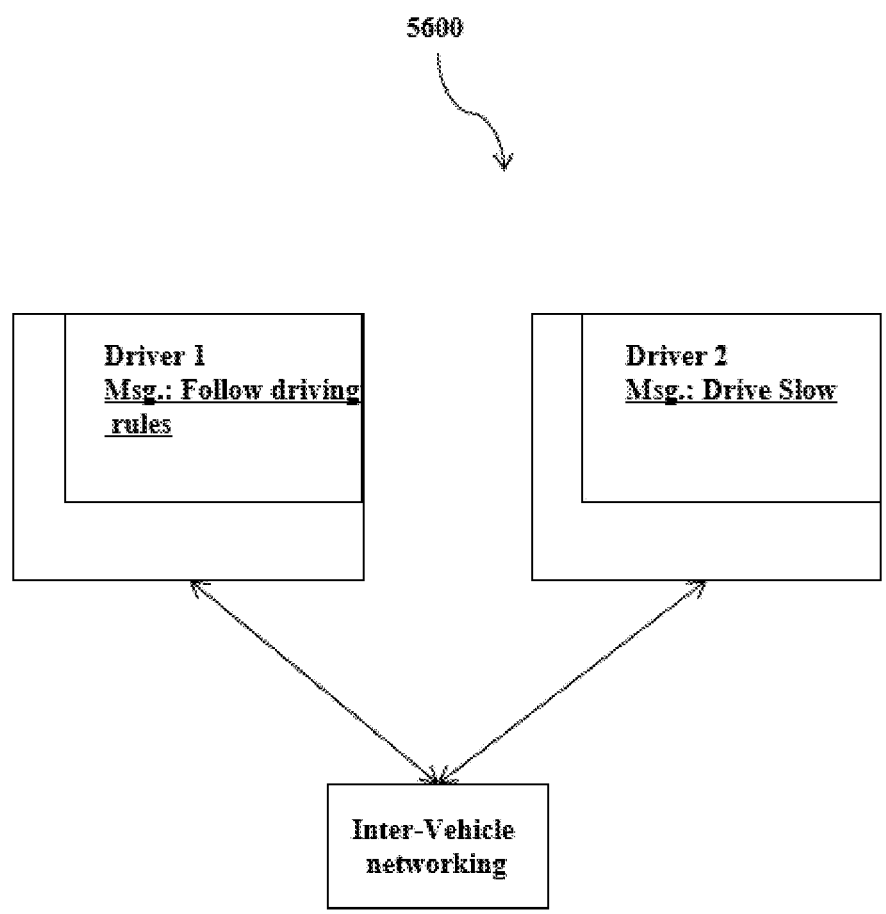
FIG. 20 is a diagram illustrates generally, a first vehicle program communicating with a second vehicle program through an Inter-Vehicle Communication, according to embodiments as disclosed herein.

FIG. 20 is a diagram 5600 illustrates generally, a first vehicle program communicating with a second vehicle program through an Inter-Vehicle networking, according to embodiments as disclosed herein. In an embodiment, the system develops inter-vehicular networking, computing, transceivers, and sensing technologies in the vehicles. Such vehicles have embedded computers, GPS receivers, short-range wireless network interfaces, and potentially access to in-car sensors and the Internet. Furthermore, they can interact with road-side wireless sensor networks and sensors embedded in other vehicles. These capabilities can be leveraged into distributed computing and sensing applications over vehicular networks for safer driving, dynamic route planning, mobile sensing, or in-vehicle entertainment. The system can include vehicular-specific network protocols, middleware platforms, and security mechanisms to process the data. As shown in FIG. 14, a first driver operating a vehicle observes a second driver operating a vehicle within his visual range and wants to send a message to the second driver. The vehicle can include identifying information that is visually ascertainable such as the model, vehicle color, number of doors, license plate number and state. The vehicle may include additional information that is only ascertainable from up close or at certain angles, or via certain technologies, such as a roof top identification number, vehicle identification number, taxi badge number, Bluetooth, or RFID code, and the like. In an embodiment, a sender having access to the vehicle monitoring device and viewing a second vehicle desires to contact the driver of the second vehicle. In one embodiment, in case of an accident as detected by an accelerometer or airbag deployment, both vehicles automatically exchange insurance information and the drivers simply confirm and signs to accept. In another embodiment, in case of a hit-and-run, the vehicle computer would automatically capture insurance information from the other vehicle and store all parameters arising from the accident for accident investigator's review. In another embodiment, if one vehicle detects that the other vehicle has a low insurance rating, the vehicle automatically enters a defensive driving mode around that vehicle. As best shown in FIG. 16, the sender initiates communication via a telephone or handheld computer or vehicle monitoring device and accesses the interface to the inter-vehicle networking service and database. The sender can select "send message" from the graphical or audio menu to send message or directly communicate with the driver of the second vehicle.

For example, the sender can directly communicate with the driver using the inter-vehicle networking or the sender can choose from a table of messages that can be sent to the driver using the inter-vehicle networking. For example, the message can take the form of voice, audio, video, or other data which can be converted to a digital signal and sent to any communications terminal. The inter-vehicle networking database receives the message or encrypted message and reconstructs the message, including the address information. The inter-vehicle networking then separates out the address information including such as for example, but not limited to, license plate number, vehicle identification number, and the like.

In an embodiment, the message may include a return address for the sender, so that a reply can be returned merely by hitting the "reply to" or "call back" button on the message. One skilled in the art would also recognize that the message could be sent anonymously or by a non-returnable address. Alternatively, the message could be a general broadcast sent by a police officer or other official sending a warning message to speeders or an informational message such as "road closed ahead" or other message.

In this case, the transceiver can be a WiMAX system. In another embodiment, the transceiver can be a meshed 802 protocol network configuration with a constantly morphing mobile mesh network that helps drivers avoid accidents, identify traffic jams miles before they encounter them, and act as a relay point for Internet access. In one embodiment, the mesh network can be the ZigBee mesh network. In another embodiment, the mesh network can be a modified Wi-Fi protocol called 802.11p standard for allowing data exchange between moving vehicles in the 5.9 GHz band. 802.11p operates in the 5.835-5.925 GHz range, divided into 7 channels of 10 MHz each. The standard defines mechanisms that allow IEEE 802.11™ technology to be used in high speed radio environments typical of cars and trucks. In these environments, the 802.11p enhancements to the previous standards enable robust and reliable car-to-car and car-to-curb communications by addressing challenges such as extreme Doppler shifts, rapidly changing multipath conditions, and the need to quickly establish a link and exchange data in very short times (less than 100 ms). Further enhancements are defined to support other higher layer protocols that are designed for the vehicular environment, such as the set of IEEE 1609™ standards for Wireless Access in Vehicular Environments (WAVE). 802.11p supports Intelligent Transportation Systems (ITS) applications such as cooperative safety, traffic and accident control, intersection collision avoidance, and emergency warning.

One variation of 802.11p is called the Dedicated Short Range Communications (DSRC), a U.S. Department of Transportation project as well as the name of the 5.9 GHz frequency band allocated for the ITS communications. More information on the 802.11p standard can be obtained from the IEEE. DSRC itself is not a mesh. It's a broadcast, so it only reaches vehicles within range. Meshing requires a lot more sophistication. There's a routing aspect to it, relaying messages to other nodes. DSRC is much simpler.

One embodiment uses high-powered, heavily encrypted Wi-Fi that establishes point-to-point connections between cars within a half-mile radius. Those connections are used to communicate vital information between vehicles, either triggering alerts to the driver or interpreted by the vehicle's computer. An intelligent car slamming on its brakes could communicate to all of the vehicles behind it that it's coming to rapid halt, giving the driver that much more warning that he too needs to hit the brakes.

But because these cars are networked—the car in front of one vehicle is connected to the car in front it and so forth—in a distributed mesh, an intelligent vehicle can know if cars miles down the road are slamming on their brakes, alerting the driver to potential traffic jams. Given enough vehicles with the technology, individual cars become nodes in a constantly changing, self-aware network that can not only monitor what's going on in the immediate vicinity, but across a citywide traffic grid.

In one embodiment, the processor receives travel routes and sensor data from adjacent vehicles, such information is then used for preparing vehicular brakes for a detected turn or an anticipated turn from adjacent vehicles. The travel routes can be transmitted over a vehicular Wi-Fi system that sends protected information to nearby vehicles equipped with Wi-Fi or Bluetooth or ZigBee nodes. In one embodiment, a mesh-network is formed with Wi-Fi transceivers, wherein each vehicle is given a temporary ID in each vehicular block, similar to a cellular block where vehicles can join or leave the vehicular block. Once the vehicle joins a group, travel routes and sensor data is transferred among vehicles in a group. Once travel routes are shared, the processor can determine potential or desired actions from the adjacent vehicles and adjust appropriately. For example, if the car in front of the vehicle is about to make a turn, the system prepares the brakes and gently tugs the driver's seat belt to give the drive notice that the car in front is about to slow down. In another example, if the processor detects that the driver is about to make a lane change to the left based on sensor data and acceleration pedal actuation, but if the processor detects that the vehicle behind in the desired lane is also speeding up, the system can warn the driver and disengage the lane change to avoid the accident. Thus, the processor receives travel routes and sensor data from adjacent vehicles and notifying the driver of a detected turn or an anticipated turn from adjacent vehicles. The processor receives travel routes and sensor data from adjacent vehicles and optimizes group vehicular speed to improve fuel efficiency. The processor receives travel routes and sensor data from adjacent vehicles and sequences red light(s) to optimize fuel efficiency. The processor notifies the driver of driving behaviors from other drivers at a predetermined location. The processor switches turn signals and brakes using a predetermined protocol to reduce insurance premium for the driver. The processor warns the driver to avoid driving in a predetermined pattern, driving during a predetermined time, driving in a predetermined area, or parking in a predetermined area to reduce insurance premium for the driver. The processor sends driver behavior data to an insurer, including at least one of: vehicle speed, vehicle accelerations, vehicle location, seatbelt use, wireless device use, turn signal use, detection of ethanol vapor, driver seating position, and time.

The various systems described above may be used by the computer to operate the vehicle and maneuver from one location to another. For example, a user may enter destination information into the navigation system, either manually or audibly. The vehicle may determine its location to a few inches based on a combination of the GPS receiver data, the sensor data, as well as the detailed map information. In response, the navigation system may generate a route between the present location of the vehicle and the destination.

When the driver is ready to relinquish some level of control to the autonomous driving computer, the user may activate the computer. The computer may be activated, for example, by pressing a button or by manipulating a lever such as gear shifter. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. The driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signaling turns or changing lanes. Once the vehicle has arrived at the destination, the vehicle may provide audible or visual cues to the driver. For example, by displaying "You have arrived" on one or more of the electronic displays.

The vehicle may be only partially autonomous. For example, the driver may select to control one or more of the following: steering, acceleration, braking, and emergency braking.

The vehicle may also have one or more user interfaces that allow the driver to reflect the driver's driving a style. For example, the vehicle may include a dial which controls the level of risk or aggressiveness with which a driver would like the computer to use when controlling the vehicle. For example, a more aggressive driver may want to change lanes more often to pass cars, drive in the left lane on a highway, maneuver the vehicle closer to the surrounding vehicles, and drive faster than less aggressive drivers. A less aggressive driver may prefer for the vehicle to take more conservative actions, such as somewhat at or below the speed limit, avoiding congested highways, or avoiding populated areas in order to increase the level of safety. By manipulating the dial, the thresholds used by the computer to calculate whether to pass another car, drive closer to other vehicles, increase speed and the like may change. In other words, changing the dial may affect a number of different settings used by the computer during its decision making processes. A driver may also be permitted, via the user interface, to change individual settings that relate to the driver's preferences. In one embodiment, insurance rates for the driver or vehicle may be based on the style of the driving selected by the driver.

Aggressiveness settings may also be modified to reflect the type of vehicle and its passengers and cargo. For example, if an autonomous truck is transporting dangerous cargo (e.g., chemicals or flammable liquids), its aggressiveness settings may be less aggressive than a car carrying a single driver—even if the aggressive dials of both such a truck and car are set to "high." Moreover, trucks traveling across long distances over narrow, unpaved, rugged or icy terrain or vehicles may be placed in a more conservative mode in order reduce the likelihood of a collision or other incident.

In another example, the vehicle may include sport and non-sport modes which the user may select or deselect in order to change the aggressiveness of the ride. By way of example, while in "sport mode", the vehicle may navigate through turns at the maximum speed that is safe, whereas in "non-sport mode", the vehicle may navigate through turns at the maximum speed which results in g-forces that are relatively imperceptible by the passengers in the car.

The vehicle's characteristics may also be adjusted based on whether the driver or the computer is in control of the vehicle. For example, when a person is driving manually the suspension may be made fairly stiff so that the person may "feel" the road and thus drive more responsively or comfortably, while, when the computer is driving, the suspension may be made such softer so as to save energy and make for a more comfortable ride for passengers.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system, comprising:
    a car sharing network that invites a plurality of riders to join the network;
    a computer configured for receiving a trip request from one or more of the plurality of riders and an order to deliver one or more items to a delivery location to a customer, said computer including a module for:
        generating a cost-effective route by matching the trip request to one or more routes having at least a common route with said delivery location; and
    generating a carpool proposal directed at a vehicle to pool the one or more of the plurality of riders and the one or more items.

2. The system of claim 1, wherein the computer sends the carpool proposal to a vehicle driver to pool the one or more of the plurality of riders and the one or more items.

3. The system of claim 1, wherein the computer retrieves a social network profile from the one or more of the plurality of riders and recommends one or more items of interests for the one or more of the plurality of riders.

4. The system of claim 1, wherein at least one of the one or more items is a food product, a perishable, a consumable, a household item, a commodity, a beverage, a fruit, a bread, a meat, a paper product, a tool, a medicine, a plastic product, and a health related product.

5. The system of claim 1, comprising a bidding system coupled to providers of the one or more items with a time constrained auction system.

6. The system of claim 5, wherein each member of the car sharing network commits to procuring an item when a winning provider is identified.

7. The system of claim 6, further comprising identifying the winning provider through at least one of an open auction system, a closed auction system, a dutch auction system, a reverse auction system, and a first to commit to a service level identified in an item group system.

8. The system of claim 1, wherein the computer compares the delivery location to existing delivery locations for a same day delivery route, and provides potential delivery times to the group.

9. The system of claim 1, comprising code for correlating possible delivery times with predetermined delivery windows, presenting to the customer potential delivery windows for the order, and receiving from the customer a selection of a delivery window.

10. The system of claim 1, comprising code for identifying, by a computer, a first set of points reachable from a planned navigation route with a cost less than a first threshold cost; identifying, by the computer, a second set of points reachable from each point in the second set with a cost less than a second threshold cost.

11. The system of claim 1, wherein the computer determines that a rider of the one or more plurality of riders comprises an elder person and adds a predetermined time buffer to deliver the one or more items due to the rider.

12. The system of claim 11, wherein the computer determines identity of the rider using one of: a camera, a body signature, and a microphone, and wherein the computer provides access to the vehicle.

* * * * *